(12) United States Patent
Omori

(10) Patent No.: US 9,551,375 B2
(45) Date of Patent: Jan. 24, 2017

(54) RADIAL FOIL BEARING

(71) Applicant: IHI Corporation, Tokyo (JP)

(72) Inventor: Naomichi Omori, Tokyo (JP)

(73) Assignee: IHI Corporation, Tokyo (JP)

( * ) Notice: Subject to any disclaimer, the term of this patent is extended or adjusted under 35 U.S.C. 154(b) by 29 days.

(21) Appl. No.: 14/620,718

(22) Filed: Feb. 12, 2015

(65) Prior Publication Data
US 2015/0159689 A1 Jun. 11, 2015

Related U.S. Application Data

(63) Continuation of application No. PCT/JP2013/071791, filed on Aug. 12, 2013.

(30) Foreign Application Priority Data

Aug. 14, 2012 (JP) ................................ 2012-179776

(51) Int. Cl.
*F16C 32/06* (2006.01)
*F16C 17/02* (2006.01)
*F16C 43/02* (2006.01)

(52) U.S. Cl.
CPC ............. *F16C 17/024* (2013.01); *F16C 43/02* (2013.01); *F16C 2226/76* (2013.01)

(58) Field of Classification Search
CPC ..... F16C 17/02; F16C 17/024; F16C 32/0603; F16C 32/0608; F16C 33/08; F16C 43/02; F16C 2226/70; F16C 2226/76
(Continued)

(56) References Cited

U.S. PATENT DOCUMENTS 4,133,585 A * 1/1979 Licht ................. F16C 17/024
384/103
4,295,689 A * 10/1981 Licht ................. F16C 17/024
384/103
(Continued)

FOREIGN PATENT DOCUMENTS

CN 1898476 A 1/2007
JP S60-175914 U 11/1985
(Continued)

OTHER PUBLICATIONS

International Search Report received for PCT Patent Application No. PCT/JP2013/071791 dated on Sep. 10, 2013, 4 pages (2 pages of English Translation and 2 pages of PCT search report).
(Continued)

*Primary Examiner* — Phillip A Johnson
(74) *Attorney, Agent, or Firm* — Amster, Rothstein & Ebenstein LLP

(57) ABSTRACT

The radial foil bearing includes: a top foil; an intermediate foil; a back foil; and a bearing housing accommodating the top foil, the intermediate foil and the back foil. The top foil is formed by winding a rectangular metal foil which includes a first uneven portion and a second uneven portion, into a cylindrical shape so as to overlap the first and second uneven portions with each other, wherein the first uneven portion is composed of a projecting portion and a depressed portion formed on one edge of the metal foil, and the second uneven portion is composed of a depressed portion, and a projecting portion formed on another edge of the metal foil. The projecting portions of the first and second uneven portions pulled out near the bearing housing engage with engagement grooves of the hearing housing.

10 Claims, 15 Drawing Sheets

(58) Field of Classification Search
USPC .......................................... 384/103, 104, 106
See application file for complete search history.

(56) References Cited

U.S. PATENT DOCUMENTS

| | | | |
|---|---|---|---|
| 4,552,466 A | | 11/1985 | Warren |
| 4,815,864 A | * | 3/1989 | Jones .................... F16C 17/024 384/103 |
| 4,850,721 A | | 7/1989 | Malabre et al. |
| 5,634,723 A | | 6/1997 | Agrawal |
| 5,902,049 A | | 5/1999 | Heshmat |
| 5,915,841 A | * | 6/1999 | Weissert ................. F16C 43/02 384/104 |
| 6,135,640 A | | 10/2000 | Nadjafi |
| 7,553,086 B2 | | 6/2009 | Kang et al. |
| 8,353,631 B2 | | 1/2013 | Kim |
| 2003/0012466 A1 | | 1/2003 | Shimizu et al. |
| 2005/0185865 A1 | | 8/2005 | Agrawal |
| 2007/0069567 A1 | | 3/2007 | Chen |
| 2008/0205803 A1 | | 8/2008 | Kato et al. |
| 2011/0052110 A1 | | 3/2011 | Kim |
| 2014/0147064 A1 | | 5/2014 | Omori |
| 2014/0169708 A1 | | 6/2014 | Omori |
| 2014/0241653 A1 | | 8/2014 | Omori |
| 2016/0010682 A1 | | 1/2016 | Omori |

FOREIGN PATENT DOCUMENTS

| | | |
|---|---|---|
| JP | H01-145418 A | 6/1989 |
| JP | 2002-061645 A | 2/2002 |
| JP | 2002-372042 A | 12/2002 |
| JP | 2003-056561 A | 2/2003 |
| JP | 2003-074550 A | 3/2003 |
| JP | 2004-190762 A | 7/2004 |
| JP | 2004-270904 A | 9/2004 |
| JP | 2005-233427 A | 9/2005 |
| JP | 2006-057652 A | 3/2006 |
| JP | 2006-057828 A | 3/2006 |
| JP | 2008-200823 A | 9/2008 |
| JP | 2009-299748 A | 12/2009 |
| JP | 2011-017385 A | 1/2011 |
| JP | 2011-033176 A | 2/2011 |
| JP | 2011-144846 A | 7/2011 |
| JP | 2013-024344 A | 2/2013 |
| JP | 2013-032799 A | 2/2013 |
| JP | 2013-087789 A | 5/2013 |
| JP | 2013-100885 A | 5/2013 |
| JP | 2013-217425 A | 10/2013 |
| WO | 2013/015098 A1 | 1/2013 |
| WO | 2013/024674 A1 | 2/2013 |

OTHER PUBLICATIONS

International Search Report received for PCT Patent Application No. PCT/JP2013/071791 dated on Aug. 23, 2013, 4 pages (2 pages of English Translation and 2 pages of PCT search report).

International Search Report and Written Opinion received for PCT Patent Application No. PCT/JP2013/071791 dated on Sep. 10, 2013, 8 pages.

* cited by examiner

RADIAL FOIL BEARING

This application is a Continuation Application based on International Application No. PCT/JP2013/071791, filed Aug. 12, 2013, which claims priority on Japanese Patent Application No. 2012-179776, filed Aug. 14, 2012, the contents of both of which are incorporated herein by reference.

TECHNICAL FIELD

The present invention relates to a radial foil bearing.

BACKGROUND ART

In the related art, as a bearing used for a high-speed rotating body, a radial bearing is known which is used in a state of being attached to a rotary shaft so as to encircle the shaft. As such a radial bearing, a radial foil bearing is well known, including a thin sheet-shaped to foil which forms the bearing surface, a back foil which elastically supports the top foil, and a cylindrical bearing housing which accommodates the top foil and the back foil. As the back foil of the radial foil bearing, a bump foil is mainly used in which a thin sheet is formed in a wave sheet shape.

In some foil bearings, for example, in order to improve the damping effect using friction between foils or to increase the rigidity of the top foil, an intermediate foil is inserted between the top foil and the back foil (refer to Patent Document 1).

In such a radial foil bearing, in general, in order to prevent the detachment of the top foil or the bump foil from the bearing housing, one end portion (toe portion) thereof is directly fixed to the bearing housing or is indirectly fixed thereto via a spacer, using spot welding. Additionally, in general, the intermediate foil is disposed on the entire circumference of the bearing housing similarly to the top foil, and one end portion thereof is also fixed to the bearing housing through welding.

In addition, in Patent Document 2, without using welding, both ends (both ends in the circumferential direction) of a top foil are locked by being thrust against fixing walls of the inner wall of a housing, to be fixed thereto.

DOCUMENT OF RELATED ART

Patent Document

[Patent Document 1] U.S. Pat. No. 5,902,049
[Patent Document 2] Japanese Unexamined Patent Application, First Publication No. 2006-57828

SUMMARY OF INVENTION

Technical Problem

However, the welding on the top foil has a high possibility that distortion occurs in the top foil because heat of the welding is applied thereto. Similarly, the welding on the intermediate foil also has a high possibility that the top foil is distorted. That is, if distortion occurs in the intermediate foil due to welding, the distortion of the intermediate foil is reflected in the top foil which is disposed on the intermediate foil, and thus distortion may occur in the top foil. In addition, even if the top foil and the intermediate foil overlapping with each other are welded at the same time, the distortion of the intermediate foil composing a lower layer is reflected in the top foil, and thus the amount of distortion of the top foil may be increased.

A structure is also known in which one end portion (toe portion) of a top foil is bent through bending machining in order to perform mechanical fixing instead of welding. However, in this case, distortion may occur in the top foil due to bending machining. Furthermore, in Patent Document 2, since both ends of the top foil are thrust against the fixing walls, reaction force is added to the top foil from both end portions toward the center portion thereof, and thus distortion may occur in the top foil.

The thickness of a fluid lubrication film of the foil bearing, which is formed between the rotary shaft and the top foil through rotation of the rotary shaft, is very thin such as about 10 µm. Accordingly, even if slight distortion occurs in the top foil, the load capability or the dynamic characteristics (the rigidity and the damping performance) of the bearing is influenced, and the designed performance thereof may not be obtained.

In a normal top foil in which one end portion (toe portion) thereof is fixed to the bearing housing through spot welding, it is difficult to fit portions near both ends (a portion near the fixed end and a portion near the free end) of the top foil into a curved surface composing the inner circumferential surface of the bearing housing, and the portions near both ends thereof may become close to be flat. Then, force (local preload) clamping the rotary shaft occurs at the portions being close to be flat, and as a result, problems may occur that the starting torque is increased, the amount of heat generated during operation exceeds the set value, or the like.

In Patent Document 2, since distortion may occur in the top foil due to the above-described reaction force, the top foil may not become close to a true circular shape along the inner circumferential surface of the bearing housing, and may become close to a polygonal shape partially including a flat portion due to the distortion. Then, a portion near the flat portion strongly contacts the rotary shaft, and thus force (local preload) clamping the rotary shaft may occur. Therefore, the starting torque may be increased, and the amount of heat generated during operation may exceed the set value.

In order to decrease such force (local preload) clamping the rotary shaft, for example, it is conceivable that peaks of the bump foil (back foil) are removed which support portions near both ends of the top foil. However, if the peaks of the bump foil are removed, the support rigidity for the rotary shaft may significantly decreases at sections in which the peaks are removed. Accordingly, the movement of the rotary shaft toward the sections due to an impact load or the like cannot be restricted, and this structure has a high possibility that a rotating portion such as an impeller provided in the rotary shaft contacts a stationary portion (housing).

In addition, in order to prevent large decrease of the support rigidity for the rotary shaft at the above sections, it is conceivable that the height of only one peak of the bump foil is decreased at the above sections. However, the amount of decrease of the height is small such as several tens of micrometers, and thus the manufacturing thereof is very difficult.

The present invention was made in view of the above circumstances, and a first object thereof is to provide a radial foil bearing in which the designed favorable performance of the bearing can be obtained with respect to the load capability and the dynamic characteristics (the rigidity and the damping performance) thereof by sufficiently decreasing distortion which occurs in a top foil, the damping effect can be improved using the friction between foils, and the machining cost thereof can be reduced. In addition, a second object thereof is to provide a radial foil bearing which can prevent the occurrence of force (local preload) clamping a rotary shaft.

Solution to Problem

According to a first aspect of the present invention, a radial foil bearing used for supporting a rotary shaft so as to encircle the rotary shaft, the radial foil bearing includes: a cylindrical top foil disposed so as to face the rotary shaft; an intermediate foil disposed outside of the top foil in a radial direction thereof; a back foil disposed outside of the intermediate foil in the radial direction; and a cylindrical bearing housing accommodating the top foil, the intermediate foil and the back foil. Engagement grooves are formed on an inner circumferential surface of the bearing housing in an axial direction thereof The top foil is formed by winding a rectangular metal foil which includes a first uneven portion and a second uneven portion, into a cylindrical shape so as to overlap the first and second uneven portions with each other, wherein the first uneven portion is composed of a projecting portion and a depressed portion formed on one edge of the metal foil, and the second uneven portion is composed of a depressed portion and a projecting portion formed on another edge of the metal foil opposite to the one edge. The projecting portion of the first uneven portion is disposed so as to be pulled out near the bearing housing through the depressed portion of the second uneven portion. The projecting portion of the second uneven portion is disposed so as to be pulled out near the bearing housing through the depressed portion of the first uneven portion. In addition, projecting portions of the first and second uneven portions pulled out near the bearing housing engage with the engagement grooves.

In the radial foil bearing, the metal foil including the first and second uneven portions is wound into a cylindrical shape so as to overlap the first and second uneven portions with each other, the projecting portions of the uneven portions are pulled out near the bearing housing, and the projecting portions pulled out are engaged with the engagement grooves formed on the inner circumferential surface of the bearing housing. Therefore, the top foil can be accommodated in and fixed to the bearing housing without performing spot welding or bending machining on the top foil and without occurrence of large reaction force in the top foil from both ends toward the center thereof Thus, it is possible to prevent the occurrence of distortion of the top foil, and to sufficiently decrease the distortion of the top foil.

In addition, the intermediate foil is provided between the top foil and the back foil. Accordingly, even if shaft vibration (self-excited vibration) occurs in the rotary shaft during rotation, the damping effect can be obtained using friction caused by slides between the top foil and the intermediate foil and further between the intermediate foil and the back foil. Thus, using the damping effect, it is possible to suppress the shaft vibration (self-excited vibration) and to easily settle the shaft vibration. Furthermore, it is possible to increase the rigidity of the top foil using the intermediate foil.

According to a second aspect of the present invention, in the first aspect, intermediate foils are disposed overlapping with each other.

In this way, the damping effect can be further obtained using friction caused by a slide between the intermediate foils, and it is possible to further easily settle the shaft vibration (self-excited vibration).

According to a third aspect of the present invention, in the first or second aspect, the intermediate foil is formed of a rectangular metal foil including an uneven portion which is composed of a projecting portion and a depressed portion formed on at least one edge of the metal foil, and the projecting portion of the uneven portion engages with an engagement groove.

In this way, the intermediate foil can also be accommodated in and fixed to the bearing housing without performing spot welding or bending machining on the intermediate foil. Thus, the occurrence of distortion of the top foil due to the distortion formed in the intermediate foil can be prevented.

According to a fourth aspect of the present invention, in any one of the first to third aspects, a through groove is formed on the inner circumferential surface of the bearing housing, wherein the through groove is continuous from one end to another end in the axial direction of the bearing housing. A fixing member is fitted into the through groove, wherein the fixing member divides the through groove in a length direction thereof, thereby forming the engagement grooves. In addition, a restriction portion is provided in the through groove and the fixing member, wherein the restriction portion restricts movement of the fixing member in the length direction of the through groove.

In this way, since the through groove is formed continuous from one end to the other end in the axial direction of the bearing housing, it is possible to easily form the through groove using, for example, wire-cut electrical discharge machining.

In addition, even if a positional difference in the axial direction occurs between the top foil and the bearing housing, the projecting portion of the top foil engaging with the engagement groove formed by dividing the through groove in the length direction is restricted by an end of the engagement groove, and the movement of the projecting portion is stopped, whereby the increase of the positional difference is prevented. Furthermore, since the restriction portion, which restricts the movement of the fixing member in the length direction of the through groove, is provided in the through groove and the fixing member, the movement of the fixing member is also stopped. Thus, the detachment of the top foil from the bearing housing is reliably prevented.

According to a fifth aspect of the present invention, in the fourth aspect, a locking recess is formed on an inner side surface of the through groove in the length direction of the through groove, wherein the locking recess allows a tip portion of the projecting portion of the top foil to be locked therein.

In this way, it is possible to easily perform the positioning and fixing of the projecting portion of the top foil by locking the projecting portion in the locking recess, and furthermore to improve the assembly reproducibility of the top foil.

According to a sixth aspect of the present invention, in the fourth or fifth aspect, the restriction portion includes locking grooves and bent pieces, wherein the locking grooves are formed on both side surfaces of the bearing housing in a thickness direction of the bearing housing so as to communicate with both end portions of the through groove, and the bent pieces are formed at both end portions of the fixing member so as to be locked into the locking grooves.

In this way, the movement of the fixing member relative to the through groove in the length direction thereof can be reliably restricted, and thereby the detachment of the top foil from the bearing housing is reliably prevented. En addition, the locking grooves can be easily formed using, for example, wire-cut electrical discharge machining.

According to a seventh aspect of the present invention, in any one of the first to sixth aspects, thin portions are formed on the one edge and on the other edge of the top foil, wherein the thin portions are thinner than an intermediate portion therebetween.

In this way, both end portions of the top foil are easily elastically deformed, and the occurrence of force (local preload) clamping the rotary shaft is suppressed at both end portions of the top foil.

According to an eighth aspect of the present invention, in the seventh aspect, surfaces of the thin portions, which are opposite to surfaces thereof facing the rotary shaft, are formed so as to be depressed from a surface of the intermediate portion, which is opposite to a surface thereof facing the rotary shaft.

In this way, a gap is formed between the surface of the thin portion, which is opposite to the surface thereof facing the rotary shaft, and the back foil positioned on the outer circumferential surface-side of the thin portion. Therefore, the occurrence of force (local preload) clamping the rotary shaft is reliably prevented at the thin portions.

Effects of Invention

According to a radial foil bearing of the present invention, the occurrence of distortion of the top foil can be prevented, and the distortion of the top foil can be sufficiently decreased. Therefore, the designed favorable performance of the bearing can be obtained with respect to the load capability and the dynamic characteristics (the rigidity and the damping performance) thereof.

In addition, since the intermediate foil is provided therein, the damping effect can be obtained using friction caused by a slide between the intermediate foil and another foil, whereby it is possible to easily settle the shaft vibration (self-excited vibration) of the rotary shaft, and furthermore to increase the rigidity of the top foil using the intermediate foil. Thus, it is possible to sufficiently improve the dynamic characteristics (the rigidity and the damping performance) of the bearing.

DESCRIPTION OF EMBODIMENTS

Hereinafter, a radial foil bearing of the present invention is described in detail with reference to the drawings. In the following drawings, the scale of each member is appropriately changed in order to show each member in a recognizable size.

Figure 1:
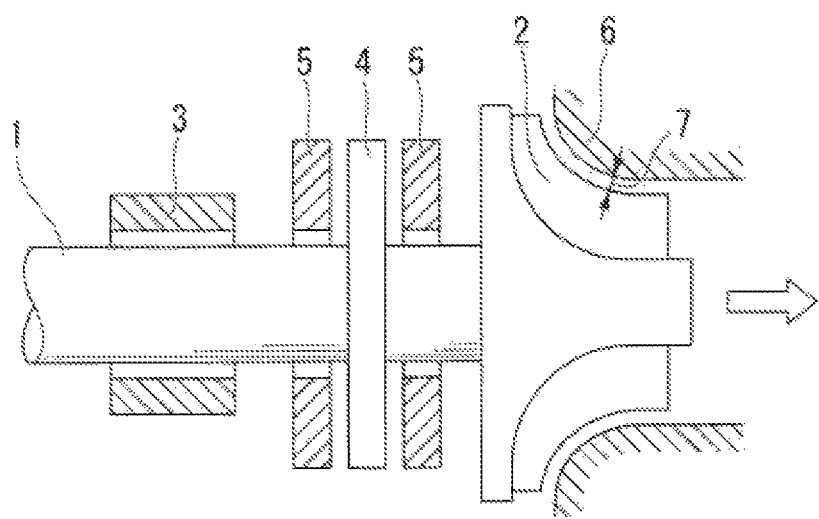
FIG. 1 is a schematic view showing an example of a turbo machine in which a radial foil bearing of the present invention is provided.

FIG. 1 is a side view showing an example of a turbo machine in which a radial foil bearing of the present invention is provided. In FIG 1, a reference numeral 1 represents a rotary shaft, a reference numeral 2 represents an impeller provided in the tip portion of the rotary shaft, and a reference numeral 3 represents a radial foil bearing according to the present invention. In addition, in FIG. 1, only one radial foil bearing is shown, and another radial foil bearing is omitted. However, in general, two radial foil bearings are provided in the axial direction of the rotary shaft 1, thereby configuring the support structure for the rotary shaft 1. Accordingly, although not shown, two radial foil bearings 3 are also provided in this embodiment.

A thrust collar 4 is fixed to the rotary shaft 1 near the position at which the impeller 2 is formed, and thrust bearings 5 are disposed at both sides of the thrust collar 4 so as to face the thrust collar 4.

The impeller 2 is disposed inside a housing 6 which is a stationary portion, and a tip clearance 7 is formed between the impeller 2 and the housing 6.

The radial foil bearing 3 is attached to the rotary shaft I at a position nearer the center of the rotary shaft I than the thrust collar 4 so as to encircle the rotary shaft I.

(First Embodiment)

Figure 2A:
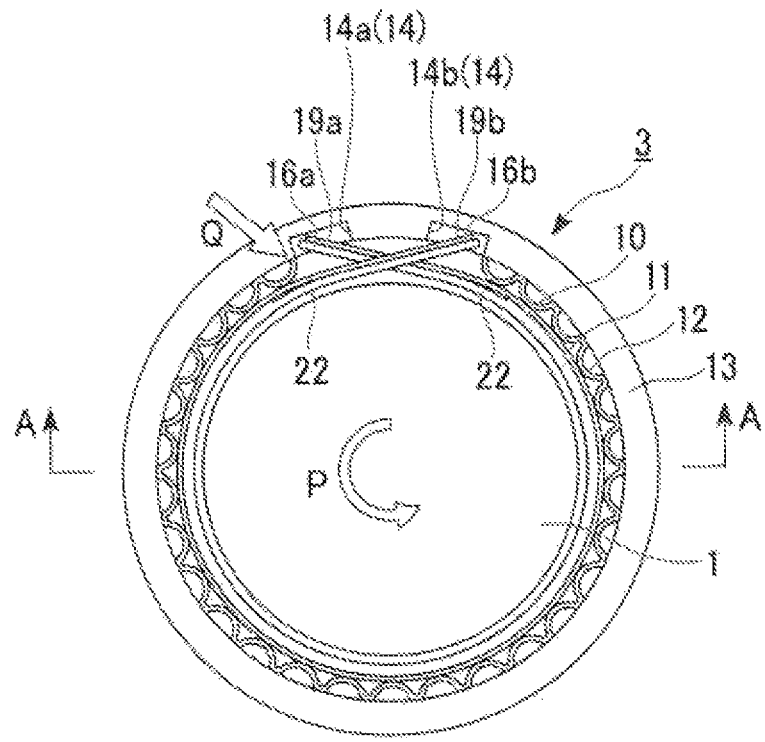
FIG. 2A is a side view of a radial foil bearing of a first embodiment of the present invention.
Figure 2B:
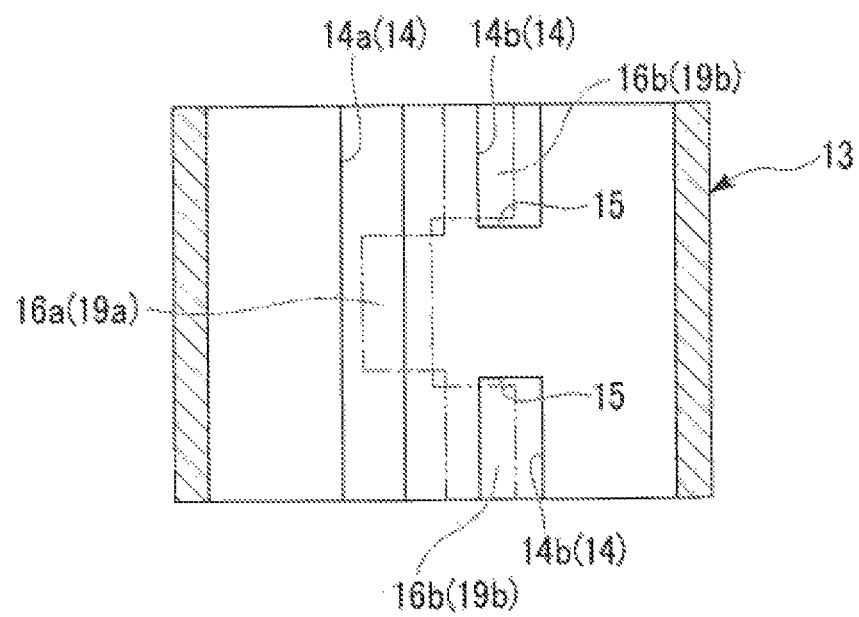
FIG. 2B is a cross-sectional view taken along A-A line of a bearing housing in FIG. 2A.

FIGS. 2A and 2B are schematic views showing a first embodiment of a radial foil bearing provided in the turbo machine having the above configuration. As shown in FIG 2A, a radial foil bearing 3 of the first embodiment is a cylindrical device which encircles the rotary shaft 1 and which supports the rotary shaft 1. The radial foil bearing 3 includes a cylindrical top foil 10 disposed facing the rotary shaft 1, an intermediate foil 11 disposed outside of the top foil 10 in the radial direction thereof, a back foil 12 disposed outside of the intermediate foil 11 in the radial direction, and a bearing housing 13 disposed outside of the back foil 12 in the radial direction.

The bearing housing 13 is a cylindrical metal member which is the outermost portion of the radial foil bearing 3 and accommodates the back foil 12, the intermediate foil 11 and the top foil 10 at the inside thereof The bearing housing 13 is provided with engagement grooves 14 which are formed on the inner circumferential surface of the bearing housing 13 in the axial direction thereof. That is, as shown in FIG 2B showing the inner circumferential surface of the bearing housing 13, a first engagement groove 14a is formed on the inner circumferential surface of the bearing housing 13 on the entire length in the axial direction of the bearing housing 13. In addition, second engagement grooves 14b are formed next to the first engagement groove 14a (next thereto in the circumferential direction) not on the entire length in the axial direction of the bearing housing 13 but only on portions of the entire length.

In this embodiment, two second engagement grooves 14b are formed on a straight line positioned next to the first engagement groove 14a. One of the second engagement grooves 14b is formed extending from one side end (one end in the axial direction) toward the center of the bearing housing 13, and the other thereof is formed extending from the other side end toward the center of the bearing housing 13. Thus, the second engagement grooves 14b do not communicate with each other at a portion near the center of the bearing housing 13, and bank portions 15 are formed at parts of the second engagement grooves 14b near the above center. wherein the bank portions 15 block the parts of the second engagement grooves 14b near the above center. In addition, the depths (depths in the radial direction) of the engagement grooves 14a and 14b are set to about 0.1 mm to several millimeters.

As shown in FIG. 2A, the back foil 12 is a member formed of a foil (thin sheet) and elastically supporting the intermediate foil 11 and the top foil 10. As such a back foil 12, for example, it is possible to use a bump foil, a sprig foil disclosed in Japanese Unexamined Patent Application, First Publication No. 2006-57652 or Japanese Unexamined Patent Application, First Publication No. 2004-270904, a back foil disclosed in Japanese Unexamined Patent Application, First Publication No. 2009-299748, or the like. In this embodiment, a bump foil is used for the back foil 12. However, the spring foil or the back foil described above may also be used for the back foil of the present invention.

As shown in FIG. 2A, in the back foil 12 (bump foil), a foil (thin sheet) is formed in a wave sheet shape and furthermore is formed in a cylindrical shape along the inner circumferential surface of the bearing housing 13. In this embodiment, the back foil 12 is arranged so that a predetermined space is formed between both ends of the back foil 12 in the circumferential direction. That is, the back foil 12 is disposed covering the inner circumferential surface of the bearing housing 13 except the engagement grooves 14 (14a and 14b) and except the portion between the engagement grooves.

In the back foil 12 formed in a wave sheet shape, valley portions contacting the bearing housing 13 and peak portions contacting the intermediate foil 11 are alternately formed in the circumferential direction of the radial foil bearing 3. In this way, the back foil 12, particularly, the peak portions contacting the intermediate foil 11, elastically supports the top foil 10 via the intermediate foil 11. In addition, fluid passageways are formed by the peak portions and by the valley portions in the axial direction of the radial foil bearing 3.

In this embodiment, the back foil 12 (bump foil) is fixed to the bearing housing 13 using spot welding or the like, similarly to the related art.

Figure 3A:
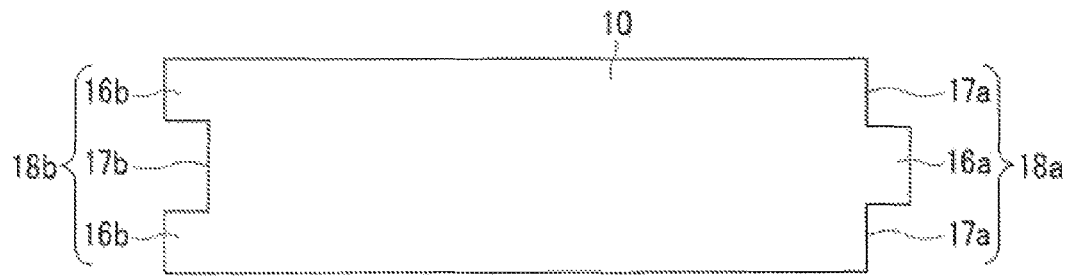
FIG. 3A is a development view of a top foil.

The top foil 10 is formed by being wound in a cylindrical shape along the inner surface of the back foil 12 (bump foil). The top foil 10 is provided with a projecting portion 16a formed on one edge (one end in the circumferential direction) thereof and with projecting portions 16b formed on the other edge thereof so that the projecting portions 16a and 16b engage with the engagement grooves 14 formed in the bearing housing 13. As shown in FIG 3A being a development view of the top foil 10, the top foil 10 is a member formed by winding a rectangular metal foil, whose long side is in the circumferential direction of the bearing and whose short side is in the length direction of the bearing, in the arrow direction (the length direction of the long side: the circumferential direction of the bearing) in FIG 3B being a side view of the metal foil, to be a cylindrical shape.

As shown in FIG 3A, the top foil 10 is provided with a first uneven portion 18a (first top foil uneven portion) and with a second uneven portion 18b (second top foil uneven portion), wherein the first uneven portion 18a includes one projecting portion 16a (top foil projecting portion) and two depressed portions 17a (top foil depressed portions) which are formed on one edge (short side) of the top foil 10, and the second uneven portion 18b includes two projecting portions 16b (top foil projecting portions) and one depressed portion 17b (top foil depressed portion) which are formed on the other edge (short side) of the top foil 10 opposite to the one edge (short side). The depressed portion 17b of the second uneven portion 18b is formed corresponding to the projecting portion 16a of the first uneven portion 18a, and the depressed portions 17a of the first uneven portion 18a are formed corresponding to the projecting portions 16b of the second uneven portion 18b.

As shown in FIG. 2A, the intermediate foil 11 is disposed between the back foil 12 (bump foil) and the top foil 10, and is formed by being wound in a cylindrical shape along the inner surface of the back foil 12 (bump foil) similarly to the top foil 10. In this embodiment, the intermediate foil 11 is also provided with a projecting portion 19a formed on one edge (one end in the circumferential direction) thereof and with projecting portions 19b formed on the other edge thereof, and the projecting portions 19a and 19b engage with the engagement grooves 14 (14a and 14b).

Figure 3B:
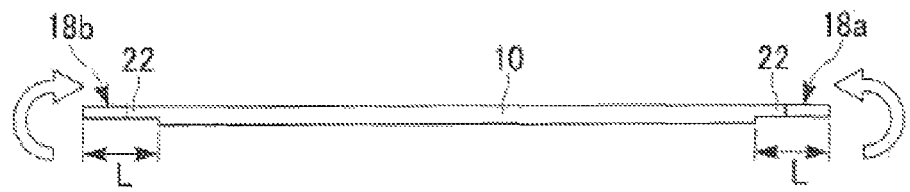
FIG. 3B is a development side view of the top foil.
Figure 3C:
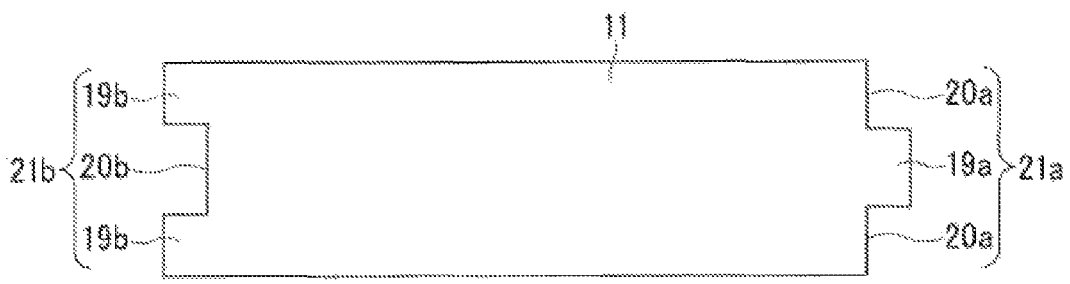
FIG. 3C is a development view of an intermediate foil.
Figure 3D:
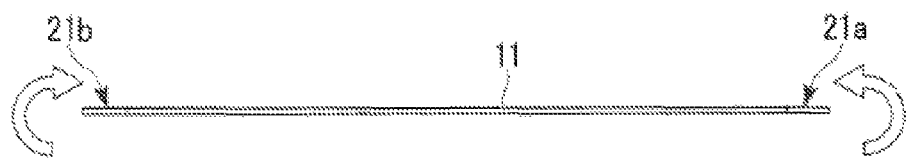
FIG. 3D is a development side view of the intermediate foil.

As shown in FIG 3C being a development view of the intermediate foil 11, the intermediate foil 11 is a member formed by winding a rectangular metal foil, whose long side is in the circumferential direction of the bearing and whose short side is in the length direction of the bearing, in the arrow direction (the length direction of the long side: the circumferential direction of the bearing) in FIG 3D being a side view of the metal foil, to be a cylindrical shape. That is, the developed planar shape of the intermediate foil 11 is formed being the same as that of the top foil 10. In addition, as described below, the thickness of the intermediate foil 11 is formed sufficiently less than that of the top foil 10.

As shown in FIG. 3C, the intermediate foil 11 is provided with a first uneven portion 21a (first intermediate foil uneven portion, uneven portion) and with a second uneven portion 21b (second intermediate foil uneven portion, uneven portion), wherein the first uneven portion 21a includes one projecting portion 19a (intermediate foil projecting portion) and two depressed portions 20a (intermediate foil depressed portions) which are formed on one edge (short side) of the intermediate foil 11, and the second uneven portion 21b includes two projecting portions 19b (intermediate foil projecting portions) and one depressed portion 20b (intermediate foil depressed portion) which are formed on the other edge (short side) of the intermediate foil 11 opposite to the one edge (short side). The depressed portion 20b of the second uneven portion 21b is formed corresponding to the projecting portion 19a of the first uneven portion 21a, and the depressed portions 20a of the first uneven portion 21a are formed corresponding to the projecting portions 19b of the second uneven portion 21b.

The intermediate foil 11 and the top foil 10 are overlapped with each other, and furthermore as shown in FIG. 2A, they are wound in a cylindrical shape so that the intermediate foil Ills positioned outside of the top foil 10 in the radial direction (positioned near the back foil 12) and the top foil 10 is positioned inside of the intermediate foil 11 in the radial direction (positioned near the rotary shaft 1). In addition, the first uneven portion 18a and the second uneven portion 18b of the top foil are overlapped with each other, and the first uneven portion 21a and the second uneven portion 21b of the intermediate foil 11 are overlapped with each other. In this state, the projecting portion 16a of the top foil 10 and the projecting portion 19a of the intermediate foil 11 together pass through the depressed portion 17b of the second uneven portion 18b of the top foil 10 and through the depressed portion 20b of the second uneven portion 21b of the intermediate foil 11. Furthermore, the projecting portions 16b of the top foil 10 and the projecting portions 19b of the intermediate foil 11 together pass through the depressed portions 17a of the first uneven portion 18a of the top foil 10 and through the depressed portions 20a of the first uneven portion 21a of the intermediate foil 11.

The projecting portions 16a and 19a passed through the depressed portions 17b and 20b and the projecting portions 16b and 19b passed through the depressed portions 17a and 20a in the above way are pulled out near the bearing housing 13 as shown in FIG. 2A, and the tip portions of the projecting portions are engaged with the engagement grooves 14 (14a and 14b) of the bearing housing 13. Therefore, the top foil 10 and the intermediate foil 11 are disposed so that the movement thereof in the circumferential direction is restricted and so that the amount of the movement thereof becomes slight.

That is, the projecting portions 16a, 16b, 19a and 19b are disposed so that the tips thereof are not strongly thrust against the sidewall surfaces or bottom surfaces of the engagement grooves 14 and so that the tips are positioned close thereto. Thus, at the time of the normal operation of the rotary shaft 1, since the projecting. portions 16a, 16b, 19a and 19b do not receive large reaction force from the engagement grooves 14, the occurrence of distortions of the top foil 10 and of the intermediate foil 11 is prevented. In addition, even when unexpected external force due to shaft deflection or the like of the rotary shaft 1 is added to the radial foil bearing 3. the top foil 10 and the intermediate foil 11 are prevented from rotating inside the bearing housing 13 and from being removed from a space between the bearing housing 13 and the rotary shaft 1.

That is, when unexpected external force is added thereto, the projecting portions 16a, 16b, 19a and 19b are locked on the sidewall surfaces or bottom surfaces of the engagement grooves 14, whereby the detachment of the projecting portions 16a, 16b, 19a and 19b from the engagement grooves 14 is prevented. Thus, the top foil 10 is prevented from rotating or being largely deformed. the projecting portions 16a and 16b are prevented from sliding out of the depressed portions 17b and 17a, and thus the top foil 10 is prevented from being detached from the bearing housing 13. In addition, the intermediate foil 11 is prevented from rotating or being largely deformed, the projecting portions 19a and 19b are prevented from sliding out of the depressed portions 20b and 20a, and thus the intermediate foil 11 is prevented from being detached from the bearing housing 13.

As shown by dashed double-dotted lines in FIG 2B, particularly, the projecting portions 16b of the top foil 10 (and the projecting portions 19b of the intermediate foil 11) engaging with the second engagement grooves 14b are restricted from moving toward the center of the bearing housing in the axial direction (inward of the bearing housing in the axial direction) by the second engagement grooves 14b. That is, the bank portions 15 are formed at parts of the second engagement grooves 14b near the center of the bearing housing 13. Accordingly, even if a positional difference in the axial direction occurs between the top foil 10 and the bearing housing 13 or between the intermediate foil 11 and the bearing housing 13, one of two projecting portions 16b (the projecting portions 19b) contacts a bank portion 15 of an engagement groove 14b and is restricted thereby, whereby the movement thereof is stopped.

In addition, the projecting portion 16a (the projecting portion 19a) is inserted into the depressed portion 17b (the depressed portion 20b) formed between two projecting portions 16b (the projecting portions 19b) in the axial direction. Accordingly, even if a positional difference in the axial direction occurs between the top foil 10 and the bearing housing 13 or between the intermediate foil 11 and the bearing housing 13, the projecting portion 16a (the projecting portion 19a) contacts one of two projecting portions 16b (the projecting portions 19b) and is restricted thereby, whereby the movement thereof is stopped.

In this way, the top foil 10 and the intermediate foil 11 are prevented from popping out of the bearing housing 13.

As shown in FIG. 3B, the top foil 10 in this embodiment is provided with thin portions 22 formed on a portion (one edge of the top foil 10) in which the first uneven portion 18a is formed and on a portion (the other edge of the top foil 10) in which the second uneven portion 18b is formed, wherein the thin portions 22 are thinner than the intermediate portion therebetween. As shown in FIG. 2A, the thin portions 22 are formed by being thinned into a state where outer circumferential surfaces of the top foil 10 (surfaces near the intermediate foil 11) are depressed from the outer circumferential surface of the above intermediate portion.

In order to form the thin portions 22. both end portions of the top foil 10 are formed so as to have a desired thickness (thinness) using, for example, etching, while the thickness thereof is controlled in 10 mm unit. Specifically, in a case where the diameter φ of the bearing housing 13 is 35 mm and the length thereof in the axial direction is 35 mm, if the thickness of the top foil 10 is about 100 μm, the thickness of the thin portion 22 is set to about 80 μm.

In such etching, stress which occurs in the top foil 10 is very small compared to that of bending machining or the like, and thus the occurrence of distortion of the top foil 10 is suppressed.

The length L in the circumferential direction of the thin portion 22 shown in FIG. 3B is set to the length obtained by adding up the distance between two engagement grooves 14 next to each other in the circumferential direction and the width of one peak in an end portion of the back foil 12 (bump foil), as shown in FIG 2A. The back foil 12 (bump foil) is formed so that the thickness thereof is about 100 μm, the height of a peak thereof is about 500 μm, and the pitch of peaks (the interval between peaks next to each other) is about 3 mm.

In this embodiment, the thin portions 22 are formed on both end portions of the top foil 10. In addition, such thin portions may also be formed on the intermediate foil 11, or may be formed not on the top foil 10 but only on the intermediate foil 11. However, in many cases, the intermediate foil 11 is formed to be very thin and has, for example, a thickness of about 30 μm, and thus the intermediate foil 11 may not have a sufficient thickness in order to form the thin portions. Accordingly, the thin portions 22 are formed only on the top foil 10 in this embodiment.

Since the thin portions 22 are formed on both end portions of the top foil 10 in the above way, both end portions thereof (the thin portions 22) are easily elastically deformed. Thus, both end portions thereof are curved along a curved surface composing the inner circumferential surface of the bearing housing 13, and the intermediate foil 11 disposed outside of the top foil 10 in the radial direction is also similarly curved. Accordingly, the occurrence of force (local preload) clamping the rotary shaft 1 at both end portions of the top foil 10 is suppressed, and similarly, the occurrence of the above force by the intermediate foil 11 is also suppressed.

Since the thin portions 22 are formed by being thinned so that the outer circumferential surfaces of both end portions of the top foil 10 are depressed from the outer circumferential surface of the intermediate portion thereof a gap is formed between the thin portion 22 and one peak in an end portion of the back foil 12 which supports the outer circumferential surface of the thin portion 22 via the intermediate foil 11. Accordingly, at the thin portions 22, the occurrence of force (local preload) clamping the rotary shaft 1 is reliably prevented. In addition, the length L of the thin portion 22 in the circumferential direction may be set to the length obtained by adding up the distance between two engagement grooves 14 next to each other in the circumferential direction and the widths of about three peaks of an end portion of the back foil 12, instead of the example shown in FIG. 2A.

Next, the operation of the radial foil bearing 3 having the above configuration is described.

In a state where the rotary shaft 1 stops, the top foil 10 is pushed by the back foil 12 via the intermediate foil 11 toward the rotary shaft 1, thereby closely contacting the rotary shaft 1. Additionally, in this embodiment, since both end portions of the top foil 10 include the thin portions 22, the occurrence of force (local preload) clamping the rotary shaft 1 at the thin portions 22 is suppressed.

When starting the rotary shaft 1 in the arrow P direction in FIG 2A, at first, the rotary shaft 1 starts rotating at a low speed, and thereafter the rotation thereof is gradually accelerated and the rotary shaft 1 rotates at a high speed. Then, as shown by the arrow Q in FIG. 2A, an ambient fluid is led from a space between an end section of the top foil 10 and of the intermediate foil 11 (the end section being near the projecting portions 16a and 19a) and one end of the back foil 12, and flows into a space between the top foil 10 and the rotary shaft 1. Therefore, a fluid lubrication film is formed between the top foil 10 and the rotary shaft 1.

At this time, in a transient state before the fluid lubrication film is formed, solid friction occurs between the rotary shaft 1 and the top foil 10, and this friction makes resistance at the time of start-up. However, as described above, preload does not occur in both end portions of the top foil 10. In addition, a side of the top foil 10 into which an ambient fluid flows includes the thin portion 22 being flexible, and the top foil 10 is configured to be easily separated from the rotary shaft 1. Therefore, after the rotary shaft 1 is started, a fluid lubrication film is formed in a short time, and the rotary shaft 1 rotates in a non-contact state with respect to the top foil 10.

In the radial foil bearing 3 having the above configuration, the projecting portions 16a and 16b pulled out from the depressed portions 17b and 17a of the top foil 10 and the projecting portions 19a and 19b pulled out from the depressed portions 20b and 20a of the intermediate foil 11 are engaged with the engagement grooves 14 (14a and 14b) formed on the inner circumferential surface of the bearing housing 13. Therefore, the top foil 10 and the intermediate foil 11 can be accommodated in and fixed to the bearing housing 13 without performing spot welding or bending machining on the top foil 10 or on the intermediate foil 11 and without occurrence of a large reaction force therein from both ends toward the center thereof Accordingly, direct occurrence of distortion of the top foil 10 can be prevented, and occurrence of distortion of the top foil 10 by reflecting, in the top foil 10, the distortion occurring in the intermediate foil 11 can also be prevented. Thus, since the distortion of the top foil 10 is sufficiently decreased, the designed favorable performance of the bearing can be obtained with respect to the load capability or the dynamic characteristics (the rigidity and the damping performance) thereof.

The intermediate foil 11 is disposed between the top foil 10 and the back foil 12, and thus, if shaft vibration (self-excited vibration) occurs in the rotary shaft 1 during rotation, film pressure variation due to the vibration is transmitted from the top foil 10 to the back foil 12 via the intermediate foil 11. At this time, slight flexure (changing due to a load) is caused to the top foil 10 due to load variation, and thereby, "slides" occur between the top foil 10 and the intermediate foil 11 and further between the intermediate foil 11 and the back foil 12. The "slides" cause energy dissipation through friction thereof, and thus the film pressure variation is damped. That is, the damping effect can be obtained. Thus, using this damping effect, it is possible to suppress the shaft vibration (self-excited vibration) and to easily settle the shaft vibration. Furthermore, the intermediate foil 11 can increase the rigidity of the top foil 10. Thus, the dynamic characteristics (the rigidity and the damping performance) of the radial foil bearing 3 can be sufficiently improved.

In the manufacturing process with respect to the top foil 10 or to the intermediate foil 11, only the forming process of the uneven portions 18a and 18b (the uneven portions 21a and 21b) through etching is added thereto, and it is possible to remove spot welding in the related art or bending machining which may cause distortion. Thus, the difficulty of the manufacture thereof can be decreased, and the manufacturing cost thereof can be reduced.

In addition, since the welding of the top foil 10 or of the intermediate foil 11 on the bearing housing 13 is removed, assembly failures or assembly variations due to welding, defects are eliminated. Thus, the reproducibility thereof is improved, and excellent mass productivity is obtained.

In a structure in the related art in which one end of a top foil or of an intermediate foil is spot-welded on a bearing housing so as to be a fixed end and another end thereof is set to a free end, if a rotary shaft is rotated in the reverse direction, the top foil or the intermediate foil may wind around the rotary shaft. hi contrast, the radial foil bearing 3 in this embodiment has approximately line symmetry as shown in FIG. 2A, and thus can accept the normal rotation and the reverse rotation of the rotary shaft 1 and can work equally therebetween. Accordingly, the radial foil bearing can also be provided in a rotating machine in which the rotary shaft thereof rotates in the reverse direction.

Since the thin portions 22 are formed on both end portions of the top foil 10, force (local preload) clamping the rotary shaft 1 also does not occur at both end portions of the top foil 10 as described above. Thus, it is possible to prevent the starting torque from increasing due to preload, and to prevent the amount of heat generated during operation from exceeding the set value.

In addition, since the thin portions 22 are formed on both end portions of the top foil 10, for example, a heat treatment process or the like, as in the related art, to fit both end portions of a top foil into an inner curved surface (inner circumferential surface) of a bearing housing is unnecessary.

Furthermore, since the thin portions 22 are formed on both end portions of the top foil 10, the end portion (corresponding to the free end in the related art) of the top foil 10, into which an ambient fluid flows, has flexibility, and thus the ambient fluid easily flows into a space between the top foil 10 and the rotary shaft 1 as described above.

Accordingly, a fluid lubrication film is formed at a low rotation speed, and thus the startability is improved.

Figure 4A:
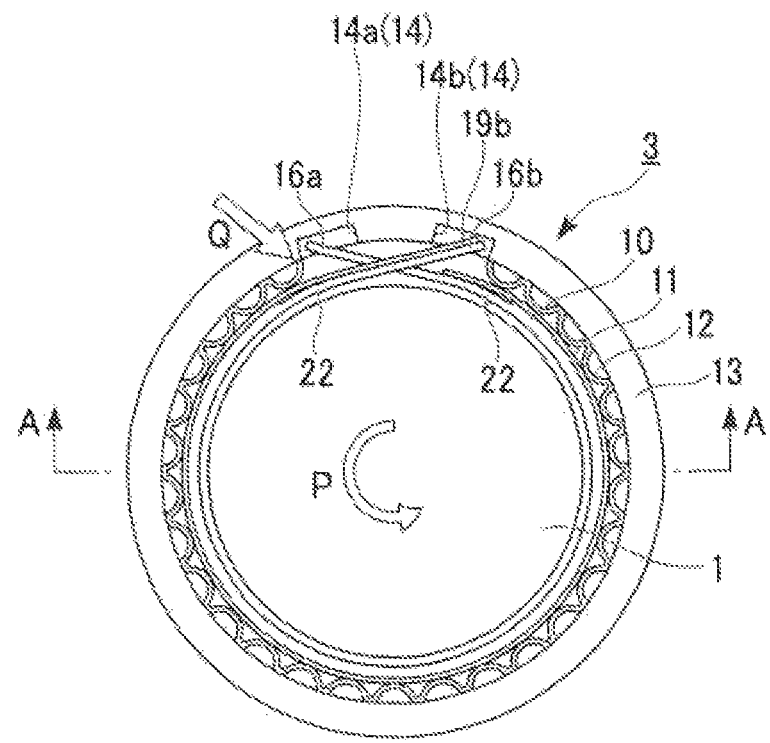
FIG. 4A is a side view of a radial foil bearing of a modification of the first embodiment.
Figure 4B:
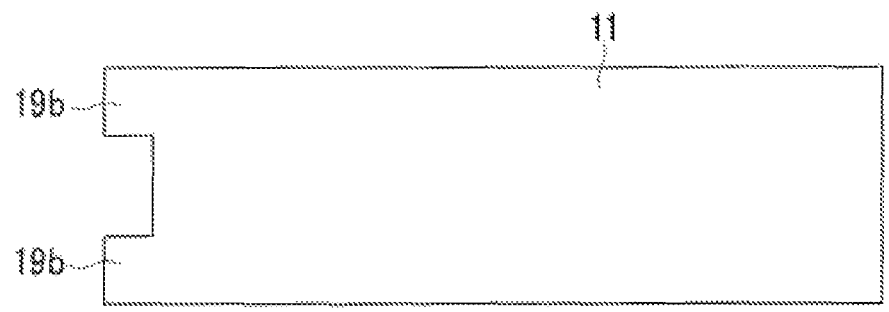
FIG. 4B is a development view of an intermediate foil.

In the above-described first embodiment, the development shape of the intermediate foil 11 is formed being the same as the development shape of the top foil 10 as shown in FIGS. 3A to 3D, and the projecting portions 19a and 19b of the intermediate foil 11 together with the projecting portions 16a and 16b of the top foil 10 are engaged with the engagement grooves 14 corresponding thereto. However, as shown in, for example, FIGS. 4A and 4B, the intermediate foil 11 may be provided with a pair of projecting portions 19b formed only on one edge (short side) thereof, and the projecting portions 19b may be engaged with a pair of second engagement grooves 14b. In this case, even if a positional difference in the axial direction occurs between the intermediate foil 11 and the bearing housing 13, one of two projecting portions 19b contacts a bank portion 15 of a second engagement groove 14b shown in FIG 2B and is restricted thereby, whereby the movement thereof is stopped. Therefore, the intermediate foil 11 is prevented from popping out of the bearing housing 13.

Figure 5A:
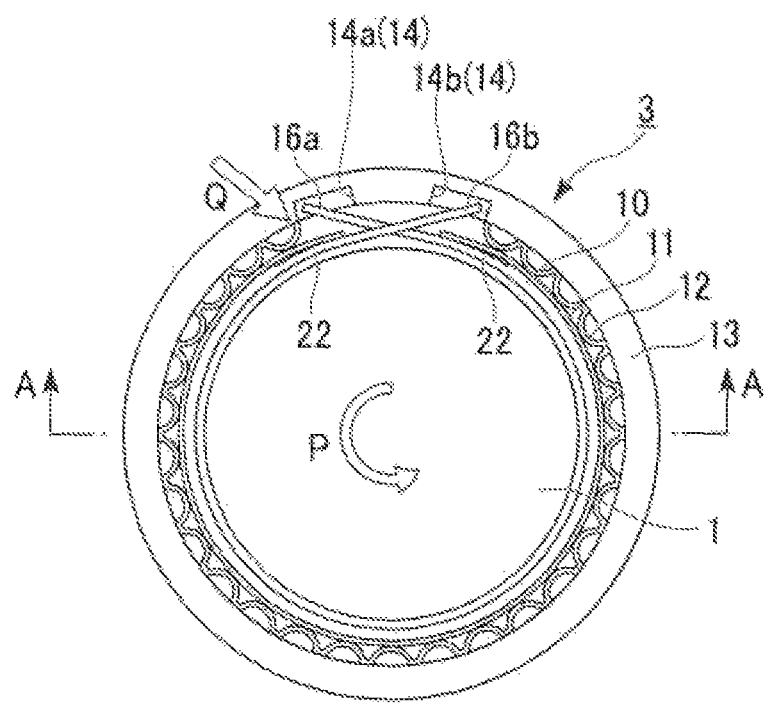
FIG. 5A is a side view of a radial foil bearing of a modification of the first embodiment.
Figure 5B:
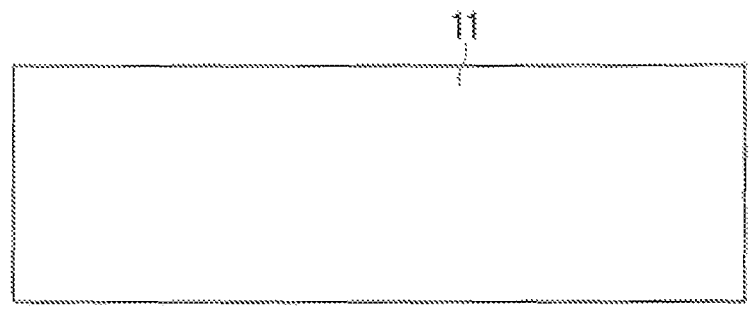
FIG. 5B is a development view of an intermediate foil.

As shown in FIGS. 5A and 5B, the uneven portions 21a and 21b may not be formed on both edges (short sides) of the intermediate foil 11, and the intermediate foil 11 may be formed having a rectangular shape by cutting off both short sides thereof. In this case, as shown in FIG. 5A, the intermediate foil 11 is disposed without engaging with an engagement groove 14. However, since the intermediate foil 11 is inserted between the back foil 12 and the top foil 10 and is held therebetween through friction, the intermediate foil 11 is prevented from popping out of the bearing housing 13 even if a positional difference in the axial direction occurs between the intermediate foil 11 and the bearing housing 13.

(Second Embodiment)

Next, a second embodiment of a radial foil bearing of the present invention is described. FIGS. 6A to 6D are schematic views showing the second embodiment of a radial foil bearing provided in the turbo machine shown in FIG. 1, and in FIG. 6A, a reference numeral 30 represents a radial foil bearing. The radial foil bearing 30 is different from the radial foil bearing 3 shown in FIG. 2A, in the shapes of a top foil and of an intermediate foil, and in the shapes of engagement grooves of a bearing housing corresponding thereto.

Figure 6A:
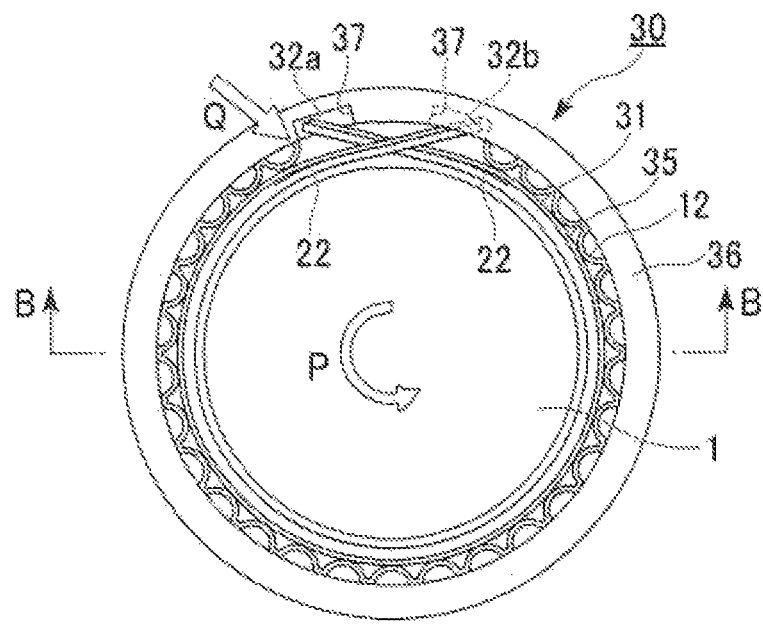
FIG. 6A is a side view of a radial foil bearing of a second embodiment of the present invention.
Figure 6B:
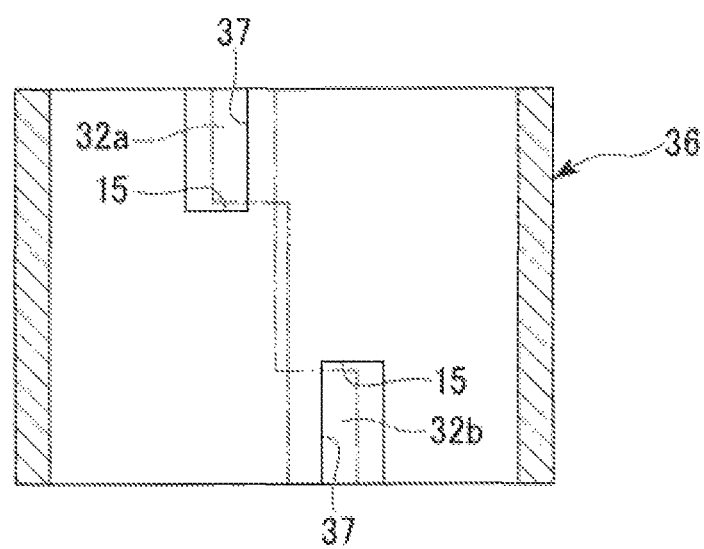
FIG. 6B is a cross-sectional view taken along B-B line of a bearing housing in FIG. 6A.
Figure 6C:
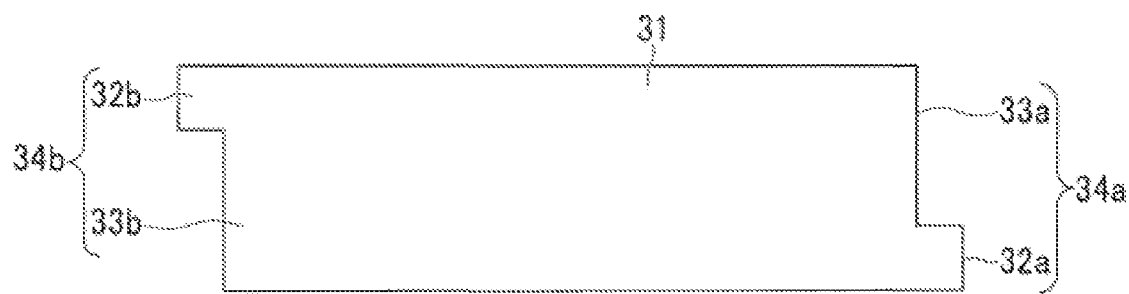
FIG. 6C is a development view of a top foil.

As shown in FIG. 6C. a top foil 31 of the radial foil bearing 30 in this embodiment is provided with a first uneven portion 34a and a second uneven portion 34b, wherein the first uneven portion 34a includes a projecting portion 32a and a depressed portion 33a which are formed on one edge (short side) thereof, and the second uneven portion 34b includes a projecting portion 32b and a depressed portion 33b which are formed on the other edge (short side) thereof opposite to the one edge (short side). The depressed portion 33b of the second uneven portion 34b is formed corresponding to the projecting portion 32a of the first uneven portion 34a, and the depressed portion 33a of the first uneven portion 34a is formed corresponding to the projecting portion 32b of the second uneven portion 34b.

The depressed portion 33b of the second uneven portion 34b is formed so that the projecting portion 32a passes through the depressed portion 33b when the top foil 31 is wound in a cylindrical shape so as to overlap the first and second uneven portions 34a and 34b with each other. Furthermore, the depressed portion 33a of the first uneven portion 34a is formed so that the projecting portion 32b passes through the depressed portion 33a when the top foil 31 is wound in a cylindrical shape. Additionally, in this embodiment, the widths (widths in the axial direction) of the depressed portions 33b and 33a are formed sufficiently greater than the widths of the projecting portions 32a and 32b corresponding thereto.

As shown in FIG. 6A, an intermediate foil 35 is disposed between a back foil 12 (bump foil) and the top foil 31. The intermediate foil 35 is wound in a cylindrical shape along the inner surface of the back foil 12 (bump foil), similarly to the top foil 31. In this embodiment, the intermediate foil 35 is formed having the same development shape as that of the top foil 31 shown in FIG. 6C. Thus, although not shown, the intermediate foil 35 is formed including projecting portions and depressed portions which have the same shapes as those of the projecting portions 32a and 32b and the depressed portions 33a and 33b.

The intermediate foil 35 is also formed so that the projecting portion of one edge thereof passes through the depressed portion of the other edge thereof when being wound in a cylindrical shape, similarly to the top foil 31. That is, the intermediate foil 35 and the top foil 31 are overlapped with each other similarly to the first embodiment, furthermore they are wound in a cylindrical shape so that the intermediate foil 35 is positioned outside of the top foil 31 in the radial direction and the top foil 10 is positioned inside of the intermediate foil 11 in the radial direction, and thereafter the projecting portions thereof are engaged with engagement grooves corresponding thereto.

Engagement grooves 37 are formed on the inner circumferential surface of a bearing housing 36, at positions corresponding to the projecting portions 32a and 32b and the like. That is, as shown in FIG. 6B showing the inner circumferential surface of the bearing housing 36, two engagement grooves 37 are formed on the inner circumferential surface of the bearing housing 36 not on the entire length in the axial direction of the bearing housing 36 but only on portions of the entire length.

One of the engagement grooves 37 is formed extending from one side end (one end in the axial direction) toward the center of the bearing housing 36, and the other thereof is formed extending from the other side end toward the center of the bearing housing 36.

The radial foil bearing 30 having the above configuration can also obtain operation and effect equivalent to that of the radial foil bearing 3 shown in FIG 2A. That is, the projecting portions 32a and 32b and the like pulled out from the depressed portions 33b and 33a and the like are engaged with the engagement grooves 37 formed on the inner circumferential surface of the bearing housing 36. Therefore, the top foil 31 and the intermediate foil 35 can be accommodated in and fixed to the bearing housing 36 without performing spot welding or bending machining on the top foil 31 or on the intermediate foil 35 and without occurrence of large reaction force from both ends toward the center thereof. Thus, direct occurrence of distortion of the top foil 31 can be prevented, and occurrence of distortion of the top foil 31 by reflecting, in the top foil 31, the distortion occurring in the intermediate foil 35 can also be prevented. Consequently, since the distortion of the top foil 31 is sufficiently decreased, the designed favorable performance of the bearing can be obtained with respect to the load capability or the dynamic characteristics (the rigidity and the damping performance) thereof.

The intermediate foil 35 is disposed between the top foil 31 and the back foil 12, and thus, if shaft vibration (self-excited vibration) occurs in the rotary shaft 1 during rotation, it is possible to suppress the shaft vibration (self-excited vibration) and to easily settle the shaft vibration, using the above-described damping effect. Furthermore, the intermediate foil 35 can increase the rigidity of the top foil 31. Thus, the dynamic characteristics (the rigidity and the damping performance) of the radial foil bearing 30 can be sufficiently improved.

Figure 6D:
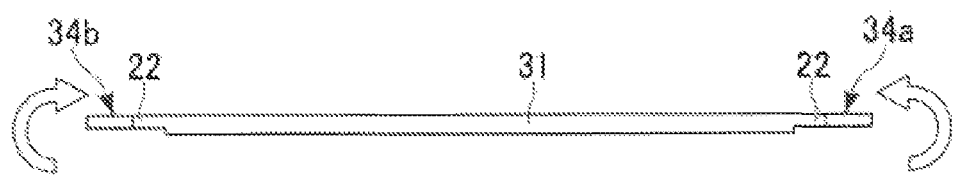
FIG. 6D is a development side view of the top foil.

As shown in FIG. 6D, thin portions 22 are formed on both end portions of the top foil 31, and thus force (local preload) clamping the rotary shaft 1 also does not occur at both end portions of the top foil 31 as described above. Thus, it is possible to prevent the starting torque from increasing due to preload, and to prevent the amount of heat generated during operation from exceeding the set value.

As shown by dashed double-dotted lines in FIG. 6B, the projecting portions 32a and 32b engaging with the engagement grooves 37 are restricted from moving toward the center of the bearing housing in the axial direction (inward of the bearing housing in the axial direction) by bank portions 15 of the engagement grooves 37, and thus the top foil 31 can be prevented from popping out of the bearing housing 36. Similarly, the intermediate foil 35 can also be prevented from popping out of the bearing housing 36.

In the above-described second embodiment, the development shape of the intermediate foil 35 is formed being the same as the development shape of the top foil 31, and the projecting portions (not shown) of the intermediate foil 35 together with the projecting portions 32a and 32b of the top foil 31 are engaged with the engagement grooves 37 corresponding thereto. However, similarly to the case shown in FIG. 4B in the first embodiment, the intermediate foil 35 may be provided with a projecting portion (not shown) formed only on one edge (short side) thereof Furthermore, similarly to the case shown in FIG. 5B, the intermediate foil 35 may be formed having a rectangular shape by cutting off both short sides thereof In this case, the intermediate foil 35 is inserted between the back foil 12 and the top foil 31 and is held therebetween using friction, and thus the intermediate foil 35 is prevented from popping out of the bearing housing 36 even if a positional difference in the axial direction occurs between the intermediate foil 35 and the bearing housing 36.

(Third Embodiment)

Figure 7A:
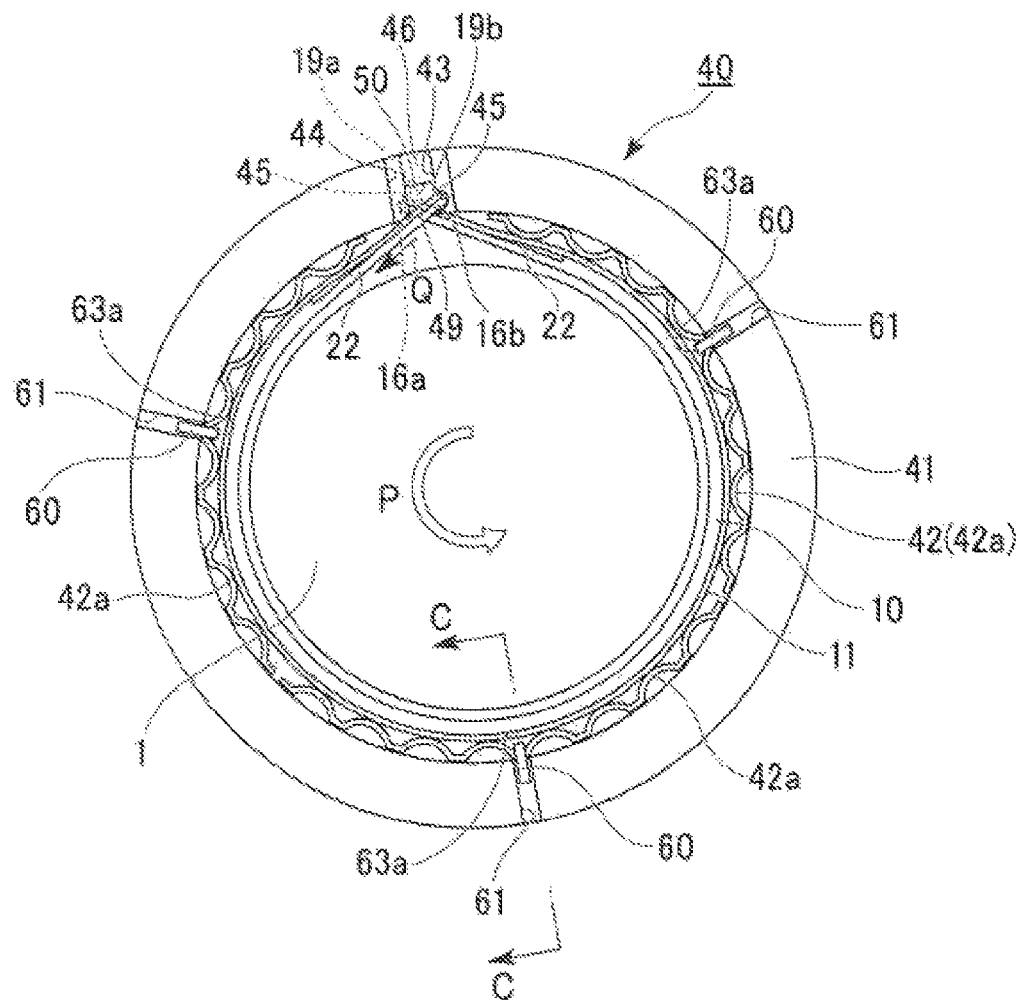
FIG. 7A is a side view of a radial foil bearing of a third embodiment of the present invention.
Figure 7B:
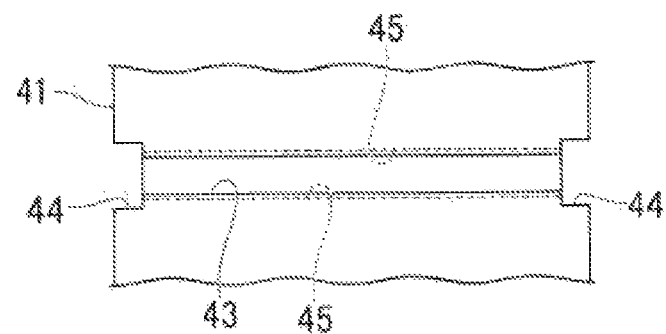
FIG. 7B is a schematic view showing a main section of the inner circumferential surface of a bearing housing.

Next, a third embodiment of a radial foil bearing of the present invention is described. FIGS. 7A and 7B are schematic views showing the third embodiment of a radial foil bearing provided in the turbo machine shown in FIG. 1, and in FIG. 7A, a reference numeral 40 represents a radial foil bearing. The radial foil bearing 40 is different from the radial foil bearing 3 shown in FIG. 2A, in the structure of an engagement groove of a bearing housing, and in the structure of a back foil.

A bearing housing 41 is a cylindrical metal member which is the outermost portion of the radial foil bearing 40, and accommodates a back foil 42, an intermediate foil 11 and a top foil 10 at the inside thereof The intermediate foil 11 and the top foil 10 are formed having approximately the same structures as those of the intermediate foil 11 and of the top foil 10 in the first embodiment shown in FIGS. 3A to 3D.

A through groove 43 is formed on the inner circumferential surface of the bearing housing 41 in the axial direction of the bearing housing 41. As shown in FIG. 7B showing a main section of the inner circumferential surface of the bearing housing 41, the through groove 43 is formed on the inner circumferential surface of the bearing housing 41 on the entire length of the bearing housing 41 so as to be continuous from one end to the other end in the axial direction thereof. The through groove 43 is formed so that the length thereof is the same as the length (length in the axial direction) of the bearing housing 41, the opening width (width of the opening in the circumferential direction) thereof is about 3 to 4 mm, and the depth (depth in the radial direction) thereof is about 1.5 to 2.5 mm.

Figure 8A:
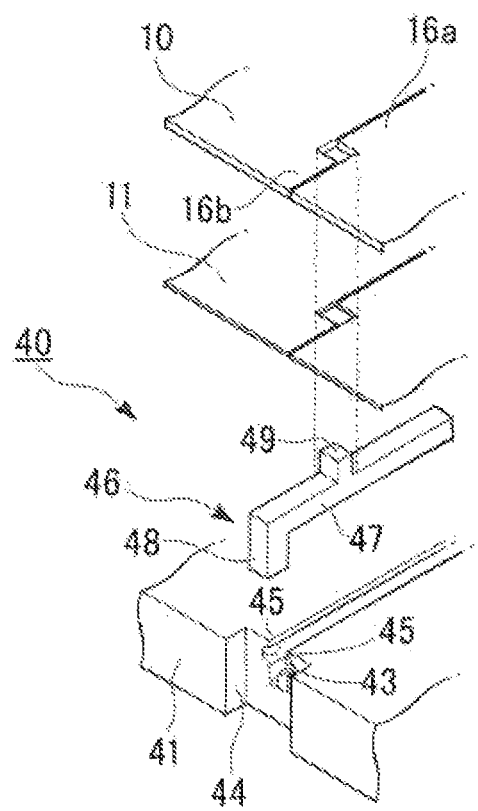
FIG. 8A is an exploded perspective view of a main section of the radial foil bearing shown in FIG 7A.

Locking grooves 44 are formed at both end portions (both end portions in the axial direction) of the through groove 43 so as to communicate with the through groove 43. As shown in FIG. 8A being an exploded perspective view of a main section of the radial foil bearing 40, the locking grooves 44 are grooves formed by cutting out parts from both side surfaces (both end surfaces in the axial direction) of the bearing housing 41. The locking grooves 44 are formed in the thickness direction (the radial direction) from the inner circumferential edge (the inner circumferential surface) to the outer circumferential edge (the outer circumferential surface) of the bearing housing 41.

Additionally, in this embodiment, the width (width in the circumferential direction) of the locking groove 44 is formed sufficiently greater than that of the through groove 43 in order to reliably communicate the locking groove 44 with the through groove 43.

Locking recesses 45 are formed on both inner side surfaces (surfaces facing each other in the circumferential direction) of the through groove 43. The locking recesses 45 are groove-shaped recesses formed in the length direction on the entire length of the through groove 43, and in this embodiment, are formed in a cross-sectional U-shape (a semicircular shape) whose maximum depth (depth in the circumferential direction) is about 0.2 to 0.3 mm. In addition, the locking recesses 45 are formed at a depth position being 1 mm or less from the opening of the through groove 43, that is, from the inner circumferential surface of the bearing housing 41. Accordingly, as described below, the tips of projecting portions of the top foil 10 and of the intermediate foil 11 can be locked in the locking recesses 45.

Wire-cut electrical discharge machining is suitably used in order to form the through groove 43 and the locking recesses 45. That is, when forming a groove continuous from one end to the other end in the axial direction of the bearing housing 41, such as the through groove 43 or the groove-shaped locking recess 45, using the wire-cut electrical discharge machining, a wire thereof is moved along the edge of the cross-sectional shape of the groove, and thereby each groove can be easily and accurately formed. Particularly, in this embodiment, if the wire-cut electrical discharge machining is adopted, the through groove 43 and the locking recesses 45 positioned on both inner side surfaces of the through groove 43 can be easily formed through a series of machining, and therefore it is possible to sufficiently decrease the machining cost of the through groove 43 and the locking recesses 45.

In the locking groove 44, a groove is formed continuous from the outer circumferential surface to the inner circumferential surface of the bearing housing 41. Accordingly, if wire-cut electrical discharge machining is adopted, it is possible to sufficiently decrease the machining cost thereof. However, since the machining of the locking groove 44 does not require particular high accuracy, it is possible to do the cutting work with, for example, an end mill, or the like.

A fixing member 46 is fitted and locked in the through groove 43 and in the locking grooves 44. As shown in FIG. 8A, in FIG. 8B being a plan view of the through groove 43 and the fixing member 46, and in FIG. 8C being a cross-sectional side view of the through groove 43 and the fixing member 46, the fixing member 46 includes a bar-shaped (square pole-shaped) base portion 47 which is fitted and accommodated in the through groove 43, a pair of bent pieces 48 which are formed on both ends of the base portion 47 and which are locked in the pair of locking grooves 44, and two partition pieces 49 which are formed in an intermediate portion of the base portion 47 and which project opposite to the bent pieces 48.

The base portion 47 is formed so that the height thereof is about 0.5 to 1.5 mm and so that the top surface thereof (the surface in which the partition piece 49 is provided) is depressed about 1 mm from the opening of the through groove 43. The bent piece 48 is formed having a length which is approximately equivalent to the distance between the bottom surface of the through groove 43 and the outer circumferential surface of the bearing housing 41. Accordingly, the bent piece 48 contacts the locking groove 44 with a sufficient contact area and is prevented from projecting from the outer circumferential surface of the bearing housing 41.

A restriction portion of the present invention is composed of the bent pieces 48 and the locking grooves 44 provided communicating with the through groove 43. That is, the pair of bent pieces 48 are locked in the locking grooves 44 provided at both ends of the through groove 43, and thus the bearing housing 41 is held between the pair of bent pieces 48 in the axial direction. Therefore, movement of the fixing member 46 is restricted in the length direction of the through groove 43 (in the axial direction of the bearing housing 41), and the movement thereof is substantially prevented except for a movement based on a clearance.

Figure 8B:
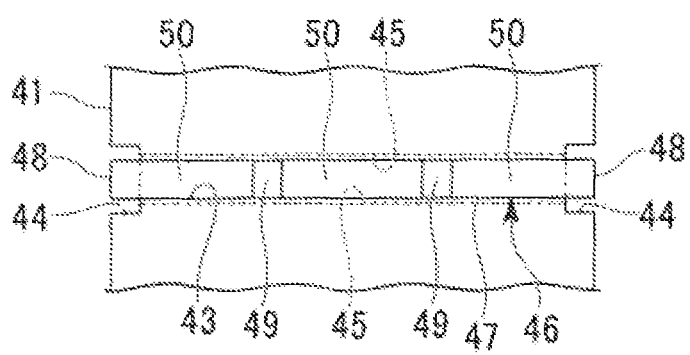
FIG. 8B is a plan view showing a state where a fixing member is fitted into a through groove.
Figure 8C:
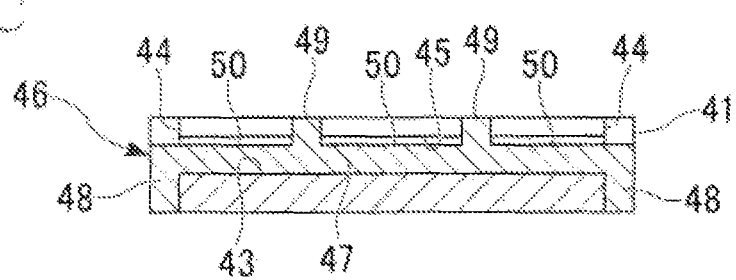
FIG. 8C is a cross-sectional side view showing a state where the fixing member is fitted into the through groove.

As shown in FIGS. 8B and 8C, the partition pieces 49 are formed at two positions which divide the base portion 47 into approximately three portions, that is, which divide the through groove 43 into approximately three grooves. The partition piece 49 is formed so that the level of the top thereof is the same as that of the opening of the through groove 43 or so that the top slightly projects from the opening of the through groove 43. For example, the partition piece 49 may project approximately half of the height of the back foil 42 from the opening of the through groove 43. The partition pieces 49 divide the through groove 43 into approximately three grooves in the length direction thereof, and thereby, three engagement grooves 50 are formed inside the through groove 43 by the fixing member 46.

That is, the fixing member 46 is fitted and locked in the locking grooves 44 and in the through groove 43 from the side of the inner circumferential surface of the bearing housing 41, and thereby the three engagement grooves 50 can be easily formed. The depth of each engagement groove 50 is set to about 1 mm, and the locking recesses 45 open at both inner side surfaces of each engagement groove 50.

The fixing member 46 can be manufactured by, for example, machining a metal plate of stainless steel or the like having a thickness (thickness in the circumferential direction) of about 3 to 4 mm using wire-cut electrical discharge machining.

Figure 9A:
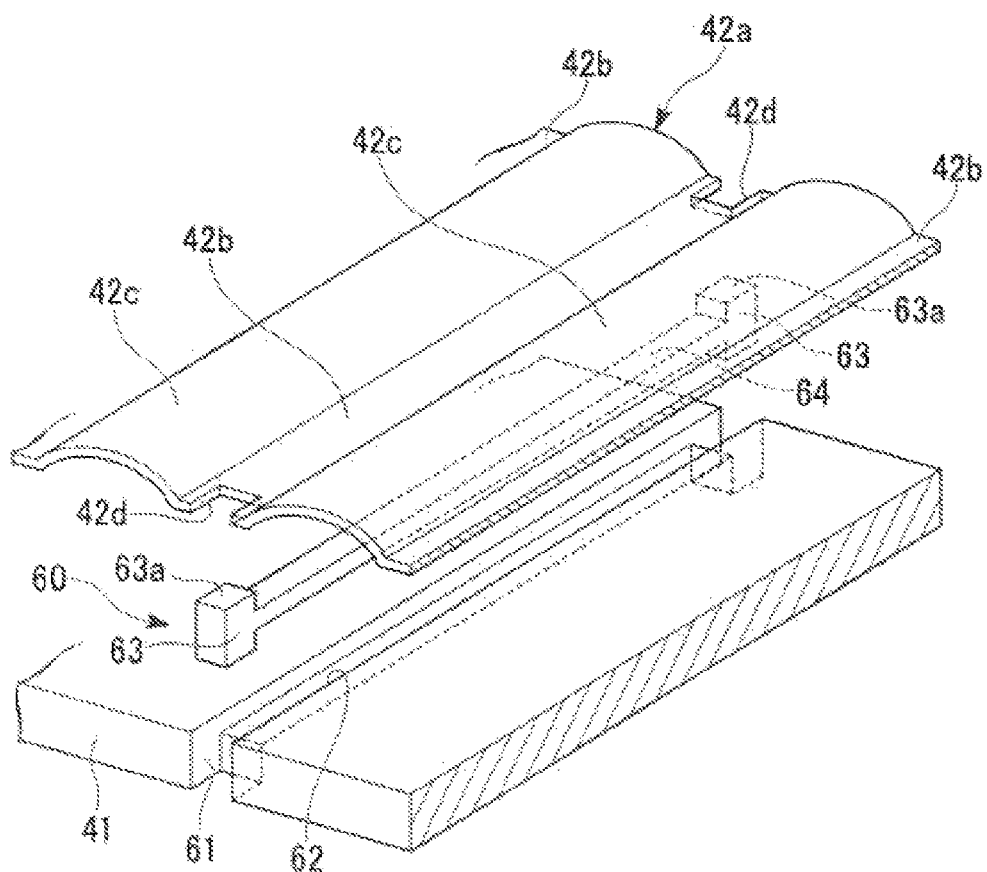
FIG. 9A is an exploded perspective view of a main section of the radial foil bearing.

As shown in FIG. 7A, engagement projections 63a are formed in the bearing housing 41 using locking members 60 in order to lock the back foil 42 (described below). That is, as shown in FIG 9A being an exploded perspective view of a main section of the radial foil bearing 40, engagement recesses 61 are formed on both side surfaces of the bearing housing 41 so as to be opposite to each other, wherein each engagement recess 61 is formed in a groove shape extending from the inner circumferential edge (inner circumferential surface) toward the outer circumferential edge (outer circumferential surface) of the bearing housing 41. A pair of engagement recesses 61 are formed at positions opposite to each other in the axial direction of the bearing housing 41. As shown in FIG 7A, the engagement recesses 61 in this embodiment are formed at positions which divide each side surface of the bearing housing 41 into approximately three areas in the circumferential direction thereof The locking members 60 are locked in the engagement recesses 61. In addition, in this embodiment, the through groove 43 is arranged in an intermediate position between two engagement recesses 61 in the engagement recesses 61 disposed at three positions in one side surface of the bearing housing 41.

As shown in FIG. 9A, grooves 62 are formed on the inner circumferential surface of the bearing housing 41, wherein the groove 62 is positioned between the engagement recesses 61 opposite to each other and communicates with each of the engagement recesses 61. The depth of the groove 62 is set to be less than that of the engagement recess 61, that is, than the depth toward the outer circumferential surface of the bearing housing 41 (in this embodiment, equivalent to the thickness of the bearing housing 41). Therefore, in this embodiment, a step is formed between the engagement recess 61 and the groove 62.

The locking member 60 is locked in the engagement recesses 61 and in the groove 62.

Figure 9B:
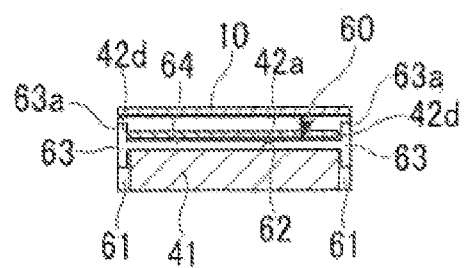
FIG. 9B is a cross-sectional view taken along C-C line in FIG 7A.

The locking member 60 includes a pair of engagement arms 63 engaging with the engagement recesses 61, and a connection portion 64 connecting the engagement arms 63, and thus is formed in an H-shape. As shown in FIG 9B being a cross-sectional view taken along C-C line in FIG 7A, the connection portion 64 is engaged with and accommodated in the groove 62, and is formed so as not to project outside of the groove 62 (inside of the bearing housing 41 in the radial direction). Specifically, the depth of the groove 62 is set to about 1 to 2 mm, and thus the height of the connection portion 64 is also set to about 1 to 2 mm.

Each of the pair of engagement arms 63 is formed extending upward and extending downward (in the radial direction) with respect to the connection portion 64, and thereby the locking member 60 is formed in an H-shape as described above. A portion of the engagement arm 63 extending upward, that is, a portion of the engagement arm 63 opposite to another portion thereof engaging with the engagement recess 61, projects from the inner circumferential surface of the bearing housing 41, and thereby composes the engagement projection 63a which engages with an engagement notch 42d of a back foil piece 42a (described below).

A portion of the engagement arm 63 extending downward (outward of the bearing in the radial direction) is locked on the above-described step between the engagement recess 61 and the groove 62. Therefore, movement of the locking member 60 is restricted in the axial direction with respect to the bearing housing 41.

The engagement arm 63 or the connection portion 64 of the locking member 60 may be formed in a square pole shape as shown in FIG. 9A, or in a columnar shape (a round bar shape). The thickness of the engagement arm 63 or of the connection portion 64 is set to about 0.3 to 0.5 mm. The locking member 60 can be manufactured by, for example, processing a metal foil of stainless steel or the like having a thickness less than 0.5 mm into an H-shape using etching or wire-cut electrical discharge machining.

The groove 62 can be formed through wire-cut electrical discharge machining, similarly to the through groove 43. In addition, the engagement recesses 61 can be formed through wire-cut electrical discharge machining, cutting work using an end mill, or the like, similarly to the locking grooves 44. That is, the through groove 43 and the grooves 62 can be continuously formed through wire-cut electrical discharge machining, and the locking grooves 44 and the engagement recesses 61 can be continuously formed through wire-cut electrical discharge machining or the like. Thus, it is possible to decrease the machining cost of the bearing housing 41.

After the grooves 62 and the engagement recesses 61 are formed in this way, the locking member 60 is fitted and locked in the engagement recesses 61 and in the groove 62 from the side of the inner circumferential surface of the bearing housing 41, and thereby the engagement projections 63a can be easily formed.

As shown in FIG. 7A, the back foil 42 is a member formed of a foil (thin sheet) and elastically supporting the intermediate foil 11 and the top foil 10, similarly to the back foil 12 in the first embodiment. In this embodiment, a bump foil is also used for the back foil 42.

In this embodiment, the back foil 42 (bump foil) includes three (a plurality of) back foil pieces 42a which are disposed in the circumferential direction of the intermediate foil 11. Each back foil piece 42a is a member in which a foil (thin sheet) is formed in a wave sheet shape and in which the side shape thereof is set to be an approximately arc shape as a whole, and all three the back foil pieces 42a are formed having the same shape and dimensions. Thus, the back foil pieces 42a are disposed so as to divide the inner circumferential surface of the bearing housing 41 into approximately three areas.

At positions between which the through groove 43 is disposed, the back foil pieces 42a are disposed forming a comparatively large gap therebetween, and at other positions, the back foil pieces 42a are disposed so that end portions thereof are adjacent to each other. According to this configuration, the three back foil pieces 42a are formed in an approximately cylindrical shape as a whole, and are disposed along the inner circumferential surface of the bearing housing 41.

Figure 10A:
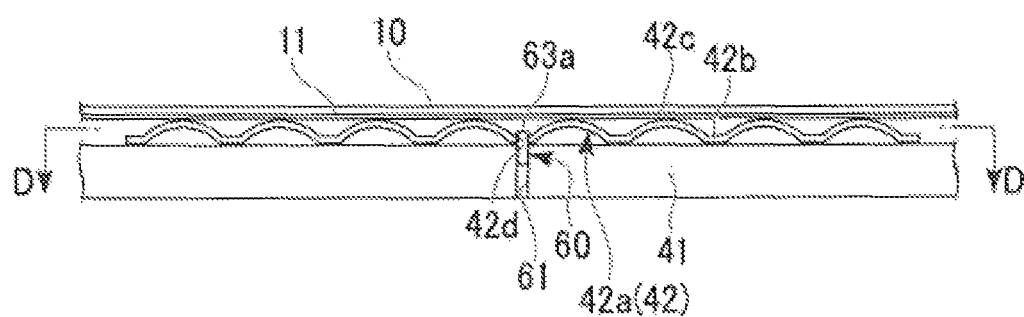
FIG. 10A is a side view in which a main section of FIG. 7A is flattened and is schematically shown.

As shown in FIG 10A in which a main section of FIG. 7A is flattened and is schematically shown, in the back foil piece 42a formed in a wave sheet shape in the above way, flattened valley portions 42b contacting the bearing housing 41 and curved peak portions 42c contacting the intermediate foil 11 are alternately formed in the circumferential direction of the bearing housing 41. Accordingly, the back foil pieces 42a elastically support the top foil 10 via the intermediate foil 11. particularly through the peak portions 42c contacting the intermediate foil 11. In addition, fluid passageways are formed by the peak portions 42c and the valley portions 42b, wherein the fluid passageway extends in the axial direction of the radial foil bearing 40.

Figure 10B:
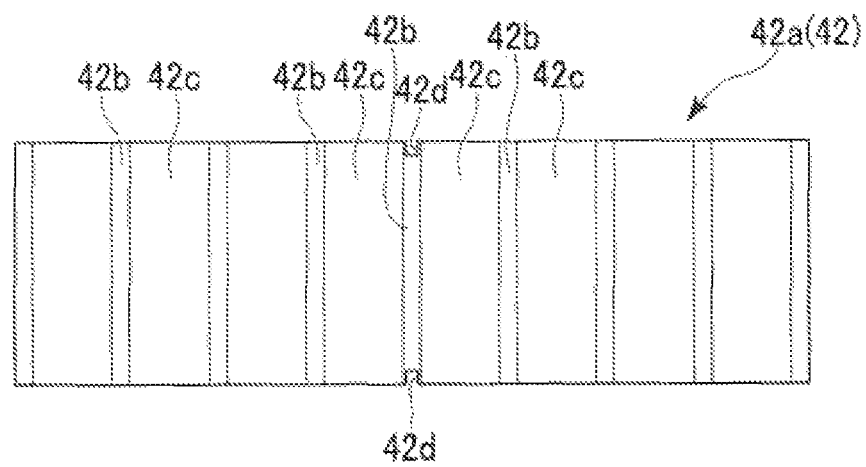
FIG. 10B is a view taken along D-D line in FIG. 10A.

As shown in FIG. 10B being a view taken along D-D line in FIG. 10A, engagement notches 42d are formed on both side edges (both ends in the axial direction) of a circumferentially center portion (a center portion in the circumferential direction of the bearing housing 41) of each back foil piece 42a. As shown in FIG. 10A, the engagement notches 42d are formed in a valley portion 42b of the back foil piece 42a, and the engagement notch 42d is a notch formed by cutting out, from the flattened valley portion 42b positioned between the peak portions 42c, a rectangular part extending from the edge toward the center of the valley portion 42b.

The engagement notch 42d is formed at a position corresponding to the engagement projection 63a of the locking member 60 provided in the bearing housing 41, that is, at a position overlapping with the engagement projection 63a. So as to engage with the engagement projection 63a, the engagement notch 42d is formed having a length and width which are approximately the same as the length and width of the engagement projection 63a. Specifically, the width of the engagement notch 42d in the circumferential direction of the bearing housing 41 is set to about 0.2 to 0.4 mm, and the length of the engagement notch 42d in the axial direction is set to about 1 to 2 mm.

In order to prevent occurrence of burr or distortion due to machining on a back foil piece, it is preferable that the engagement notch 42d be formed by performing etching or electrical discharge machining on a foil. That is, it is preferable that the engagement notches 42d be formed in a foil using etching or electrical discharge machining, and thereafter, press molding be performed on the foil in order to form the peak portions 42c and the valley portions 42b, thereby forming the back foil piece 42a.

Based on this configuration, as shown in FIGS. 9A and 10A, the engagement notch 42d of the back foil piece 42a engages with the engagement projection 63a of the bearing housing 41.

In this way, the engagement notch 42d of the back foil piece 42a engages with the engagement projection 63a extending upward of the engagement arm 63, and in this state, the three back foil pieces 42a are disposed on the inner circumferential surface of the bearing housing 41. Therefore, the locking member 60, particularly, the connection portion 64 thereof, is covered with the back foil piece 42a, whereby the detachment of the locking member 60 from the bearing housing 41 is prevented.

As shown in FIG 7A, the intermediate foil 11 and the top foil 10 have approximately the same structures as those of the intermediate foil 11 and of the top foil 10 in the first embodiment shown in FIGS. 3A to 3D, respectively. The intermediate foil 11 and the top foil 10 are overlapped with each other, and then are wound in a cylindrical shape along the inner surface of the back foil 42 composed of three back foil pieces 42a. The top foil 10 is provided with a projecting portion 16a formed on one edge thereof and with projecting portions 16b formed on another edge thereof and the projecting portions 16a and 16b engage with the engagement grooves 50 in the through groove 43 formed in the bearing housing 41. In addition, the intermediate foil 11 is provided with a projecting portion 19a formed on one edge thereof and with projecting portions 19b formed on another edge thereof, and the projecting portions 19a and 19b together with the projecting portions 16a and 16b engage with the engagement grooves 50 in the through groove 43.

The top foil 10 is provided with a first uneven portion 18a and a second uneven portion 18b (refer to FIG. 3A) which are formed so that a gap is formed between the projecting portion 16a and each of the pair of projecting portions 16b when the projecting portion 16a of the first uneven portion 18a passes through the depressed portion 17b of the second uneven portion 18b wherein the gap corresponds to the width of the partition piece 49 of the fixing member 46. Similarly, the intermediate foil 11 is provided with a first uneven portion 21a and a second uneven portion 21b (refer to FIG. 3C) which are formed so that a gap is formed between the projecting portion 19a and each of the pair of projecting portions 19b when the projecting portion 19a of the first uneven portion 21a passes through the depressed portion 20b of the second uneven portion 21b, wherein the gap corresponds to the width of the partition piece 49 of the fixing member 46.

In addition, the projecting portions 16a, 16b, 19a and 19b are formed so that the widths thereof correspond to the lengths of the engagement grooves 50 formed by the through groove 43 and by the fixing member 46 and the widths are approximately the same as the lengths.

Figure 11:
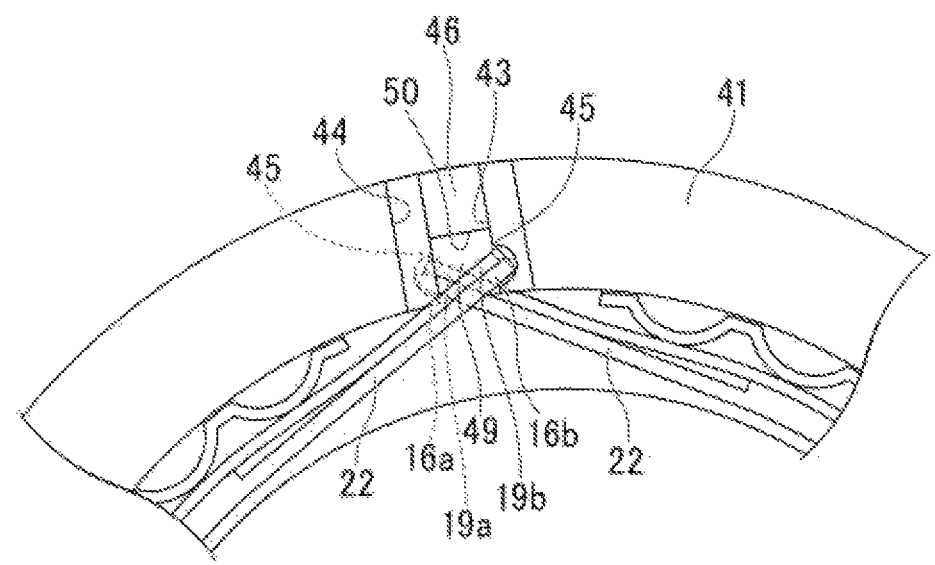
FIG. 11 is an enlarged view of a main section of FIG. 7A.

As shown in FIG. 7A, the projecting portions 16a and 16b passed through the depressed portions 17b and 17a and the projecting portions 19a and 19b passed through the depressed portions 20b and 20a are pulled out near the bearing housing 41, and the tips thereof are engaged with the engagement grooves 50 of the bearing housing 41. In this embodiment, as shown in FIG 11 being an enlarged view of a main section of FIG. 7A. the tips of the projecting portions 16a. 16b, 19a and 19b are inserted into and engaged with the engagement grooves 50 in the through groove 43, and thereafter are further inserted into the locking recesses 45, to be locked therein. Therefore, the top foil 10 and the intermediate foil 11 are arranged so that the movement thereof in the circumferential direction is restricted and the amount of the movement is maintained to be slight.

That is, the projecting portions 16a. 16b, 19a and 19b are arranged so that the tips thereof are not strongly thrust against inner surfaces of the locking recesses 45 and so that the edge surfaces of the tips thereof contact inner surfaces of the locking recesses 45. Accordingly, at the time of the normal operation of the rotary shaft 1, since the projecting portions 16a, 16b, 19a and 19b do not receive large reaction force from the locking recesses 45 or from the engagement grooves 50, the occurrence of distortion of the top foil 10 or of the intermediate foil 11 is prevented. In addition, even when unexpected external force due to shaft deflection or the like of the rotary shaft 1 is added to the radial foil bearing 40, both of the top foil 10 and the intermediate foil 11 are prevented from rotating inside the bearing housing 41 and from being removed from a space between the bearing housing 41 and the rotary shaft 1.

That is, when unexpected external force is added thereto, the projecting portions 16a, 16b, 19a and 19b are strongly locked on inner surfaces of the locking recesses 45, and thereby the projecting portions 16a. 16b, 19a and 19b are prevented from getting out of the locking recesses 45 and further of the engagement grooves 50. Accordingly, the top foil 10 is prevented from rotating or being largely deformed, the projecting portions 16a and 16b are prevented from sliding out of the depressed portions 17b and 17a, and thus the top foil 10 is prevented from being detached from the bearing housing 41. In addition, the intermediate foil 11 is prevented from rotating or being largely deformed, the projecting portions 19a and 19b are prevented from sliding out of the depressed portions 20b and 20a, and thus the intermediate foil 11 is prevented from being detached from the bearing housing 41.

The movement of the projecting portions Ia, 16b, 19a and 19b in the axial direction is restricted by the partition pieces 49 of the fixing member 46 which form the engagement grooves 50. That is, both sides of the projecting portion 16a are restricted by the partition pieces 49, whereby the first uneven portion 18a including the projecting portion 16a is restricted from moving in the axial direction. In addition, both sides of the projecting portion 19a are restricted by the partition pieces 49, whereby the first uneven portion 21a including the projecting portion 19a is restricted from moving in the axial direction.

The two projecting portions 16b are restricted by the two partition pieces 49 from moving in opposite directions in the axial direction, whereby the second uneven portion 18b including the projecting portions 16b is restricted from moving in the axial direction. In addition, the two projecting portions 19b are restricted by the two partition pieces 49 from moving in opposite directions in the axial direction, whereby the second uneven portion 21b including the projecting portions 19b is restricted from moving in the axial direction. In this way, since the movement of the top foil 10 and the intermediate foil 11 is restricted in the axial direction of the bearing housing 41, the top foil 10 and the intermediate foil 11 are prevented from popping out of the bearing housing 41.

Next, the operation of the radial foil bearing 40 having the above configuration is described.

In a state where the rotary shaft 1 stops, the top foil 10 is pushed by the back foil 42 (three back foil pieces 42a) via the intermediate foil 11 toward the rotary shaft 1, thereby closely contacting the rotary shaft 1. In addition, in this embodiment, since both end portions of the top foil 10 include the thin portions 22 similarly to the first embodiment, the occurrence of force (local preload) clamping the rotary shaft 1 in the thin portions 22 is suppressed.

When starting the rotary shaft 1 in the arrow P direction in FIG. 7A, at first, the rotary shaft 1 starts rotating at a low speed, and thereafter the rotation thereof is gradually accelerated and the rotary shaft 1 rotates at a high speed. Then, as shown by the arrow Q in FIG 7A, an ambient fluid is led from a space between one end section of the top foil 10 and of the intermediate foil 11 and one end of the back foil piece 42a, and flows into a space between the top foil 10 and the rotary shaft 1. Therefore, a fluid lubrication film is formed between the top foil 10 and the rotary shaft 1.

The film pressure of the fluid lubrication film is added to the top foil 10, and presses, via the top foil 10 and the intermediate foil 11, each peak portion 42c of the back foil pieces 42a contacting the intermediate foil 11. Then, the back foil pieces 42a are pressed by the top foil 10, and thus the peak portions 42c are pressed and extended, whereby the back foil pieces 42a start moving on the bearing housing 41 in the circumferential direction thereof That is, since the back foil pieces 42a (the back foil 42) elastically support the top foil 10 via the intermediate foil 11, the back foil pieces 42a are deformed in the circumferential direction at the time of receiving a load from the top foil 10, and thereby accept the flexure of the top foil 10 and support it.

However, as shown in FIGS. 9A and 9B, the engagement projections 63a of the locking member 60 engage with the engagement notches 42d provided in side edges of the back foil piece 42a, whereby the back foil piece 42a is prevented from rotating in the circumferential direction on the inner circumferential surface of the bearing housing 41. Thus, although each peak portion 42c of the back foil piece 42a is deformed (moves) in the circumferential direction in a state where the engagement notch 42d engaging with the engagement projection 63a is the fixed point (fixed end) thereof, the center of the back foil piece 42a is prevented from deviating from the original position thereof.

When the back foil piece 42a is deformed (moves) in the circumferential direction, the back foil piece 42a receives the influence of friction with the bearing housing 41 or with the intermediate foil 11. Therefore, although both end portions of the back foil piece 42a, that is, free ends, are easily deformed (easily move), it is difficult to deform portions thereof near the above fixed point (fixed end). Accordingly, a difference in support rigidity may occur between a portion near the free end and a portion near the fixed end of the back foil piece 42a.

However, in this embodiment, the engagement notch 42d is formed in the center of the back foil piece 42a in the circumferential direction, and thus the fixed point by the engagement projection 63a is arranged in the center of the back foil piece 42a in the circumferential direction. Therefore, the distance between the fixed end and the free end is decreased, and the above difference in support rigidity is decreased. Furthermore, in this embodiment, since the back foil 42 is divided into three back foil pieces 42a, the distance between the fixed end and the free end is further decreased compared to a case where the back foil 42 is composed of one foil, and thus the difference in support rigidity between a portion near the free end and a portion near the fixed end thereof is further decreased.

At the time the rotary shaft 1 rotates at a high speed, the engagement projections 63a hold the movement of the back foil piece 42a in the axial direction. Therefore, even if unexpected impact or the like is added thereto, the detachment of the back foil piece 42a from the bearing housing 41 can be prevented.

Additionally, in a transient state before the fluid lubrication film is formed, solid friction occurs between the rotary shaft 1 and the top foil 10, and this friction makes resistance at the time of start-up. However, as described above, preload does not occur in both end portions of the top foil 10. In addition, a side of the top foil 10 into which an ambient fluid flows includes the thin portion 22 being flexible, and the top foil 10 is configured to be easily separated from the rotary shaft 1. Therefore, after the rotary shaft 1 is started, a fluid lubrication film is formed in a short time, and the rotary shaft 1 rotates in a non-contact state with respect to the top foil 10.

In the radial foil bearing 40 having the above configuration, the projecting portions I 6a and 16b pulled out from the depressed portions 17b and 17a of the top foil and the projecting portions 19a and 19b pulled out from the depressed portions 20b and 20a of the intermediate foil 11 are engaged with the engagement grooves 50 which are formed in the through groove 43 on the inner circumferential surface of the bearing housing 41 using the fixing member 46. Therefore, the top foil 10 and the intermediate foil 11 can be accommodated in and fixed to the bearing housing 41 without performing spot welding or bending machining on the top foil 10 or on the intermediate foil 11 and without the occurrence of a large reaction force therein from both ends toward the center thereof. Accordingly, direct occurrence of distortion of the top foil 10 can be prevented, and occurrence of distortion of the top foil 10 by reflecting, in the top foil 10, the distortion occurring in the intermediate foil 11 can also be prevented. Thus, since the distortion of the top foil 10 is sufficiently decreased, the designed favorable performance of the bearing can be obtained with respect to the load capability or the dynamic characteristics (the rigidity and the damping performance) thereof.

The intermediate foil 11 is disposed between the top foil 10 and the back foil 42, and thus, if shaft vibration (self-excited vibration) occurs in the rotary shaft 1 during rotation, the damping effect can be obtained using friction caused by slides between the top foil 10 and the intermediate foil 11 and further between the intermediate foil 11 and the back foil 42. Therefore, it is possible to suppress the shaft vibration (self-excited vibration) and to easily settle the shaft vibration, using the damping effect. Furthermore, the intermediate foil 11 can increase the rigidity of the top foil 10. Thus, the dynamic characteristics (the rigidity and the damping performance) of the radial foil bearing 40 can be sufficiently improved.

Since the through groove 43 is formed continuous from one end to the other end in the axial direction of the bearing housing 41, the through groove 43 can be easily formed through wire-cut electrical discharge machining, and thus the machining cost thereof can be decreased so as to be low.

In addition, even if a positional difference in the axial direction occurs between the top foil 10 and the bearing housing 41 or between the intermediate foil 11 and the bearing housing 41, the projecting portions 16a, 16b, 19a and 19b, which engage with the engagement grooves 50 formed by dividing the through groove 43 in the length direction thereof, are restricted by the ends (the partition pieces 49) of the engagement grooves 50 and the movement thereof is stopped, and therefore the increase of the positional difference can be prevented. Furthermore, since the restriction portion, which restricts the fixing member 46 from moving in the length direction of the through groove 43, is formed of the locking grooves 44 of the through groove 43 and of the bent pieces 48 of the fixing member 46, the movement of the fixing member 46 can also be stopped. Thus, the detachment of the top foil 10 and of the intermediate foil 11 from the bearing housing 41 can be reliably prevented.

Since the tips of the projecting portions 16a and 16b of the top foil 10 and of the projecting portions 19a and 19b of the intermediate foil 11 are engaged with the locking recesses 45 formed on inner side surfaces of the through groove 43, it is possible to easily perform the positioning and locking of the projecting portions 16a, 16b, 19a and 19b, and furthermore to improve the assembly reproducibility of the top foil 10 or the intermediate foil 11.

In addition, since the welding of the top foil 10 or of the intermediate foil 11 on the bearing housing 41 is removed, assembly failures or assembly variations due to welding defects are eliminated. Thus, the reproducibility thereof is improved, and excellent mass productivity is obtained.

Since the thin portions 22 are formed on both end portions of the top foil 10, force (local preload) clamping the rotary shaft 1 also does not occur at both end portions of the top foil 10 as described above. Thus, it is possible to prevent the starting torque from increasing due to preload, and to prevent the amount of heat generated during operation from exceeding the set value.

In addition, since the thin portions 22 are formed on both end portions of the top foil 10, for example, a heat treatment process, as in the related art, to fit both end portions of a top foil into an inner curved surface (inner circumferential surface) of a bearing housing is unnecessary.

Furthermore, since the thin portions 22 are formed on both end portions of the top foil 10, the vicinity of an end (corresponding to the free end in the related art) of the top foil 10, into which an ambient fluid flows, has flexibility, and thus the ambient fluid easily flows into a space between the top foil 10 and the rotary shaft 1 as described above.

Accordingly, a fluid lubrication film is formed at a low rotation speed. and thus the startability is improved.

The engagement notch 42d formed at each of both side edges of the back foil piece 42a is engaged with the engagement projection 63a formed at each of both side ends of the inner circumferential surface of the bearing housing 41, whereby the back foil piece 42a is fixed to the bearing housing 41. Accordingly, the back foil piece 42a can be accommodated in and fixed to the bearing housing 41 without performing spot welding or bending machining on the back foil piece 42a. Thus, the occurrence of distortion of the top foil 10 due to spot welding on the back foil 42 (the back foil pieces 42a) or due to the distortion of the back foil 42 can be prevented, and the distortion of the top foil 10 can be sufficiently decreased. Consequently, the designed favorable performance of the bearing can be obtained with respect to the load capability or the dynamic characteristics (the rigidity and the damping performance) thereof.

In the above-described third embodiment, the development shape of the intermediate foil 11 is formed being the same as the development shape of the top foil 10, similarly to the first embodiment, and the projecting portions 19a and 19b of the intermediate foil 11 together with the projecting portions 16a and 16b of the top foil 10 are engaged with the engagement grooves 50 corresponding thereto. However, similarly to the first embodiment, as shown in, for example, FIGS. 4A and 4B, the intermediate foil 11 may be provided with only a pair of projecting portions 19b formed on one edge (short side) thereof, and the projecting portions 19b may be engaged with the engagement grooves 50 corresponding thereto. In this case, even if a positional difference in the axial direction occurs between the intermediate foil 11 and the bearing housing 41, one of two projecting portions 19b contacts a partition piece 49 and is restricted thereby. whereby the movement thereof is stopped. Therefore, the intermediate foil 11 is prevented from popping out of the bearing housing 41.

As shown in FIGS. 5A and 5B, the uneven portions 21a and 21b may not be formed on both edges (short sides) of the intermediate foil 11, and the intermediate foil 11 may be formed having a rectangular shape by cutting off both short sides thereof In this case, although the intermediate foil 11 is disposed without engaging with the engagement grooves 50, the intermediate foil 11 is inserted between the back foil 42 and the top foil 10 and is held therebetween using friction. Thus, the intermediate foil 11 is prevented from popping out of the bearing housing 41 even if a positional difference in the axial direction occurs between the intermediate foil 11 and the bearing housing 41.

(Fourth Embodiment)

Next, a fourth embodiment of a radial foil bearing of the present invention is described.

The radial foil bearing in this embodiment can also be used for a radial foil bearing provided in the turbo machine shown in FIG. 1. This radial foil bearing is different from the radial foil bearing 40 in the third embodiment, in the shapes of a top foil and of an intermediate foil, and in the shapes of engagement grooves of a bearing housing corresponding thereto.

Figure 12A:
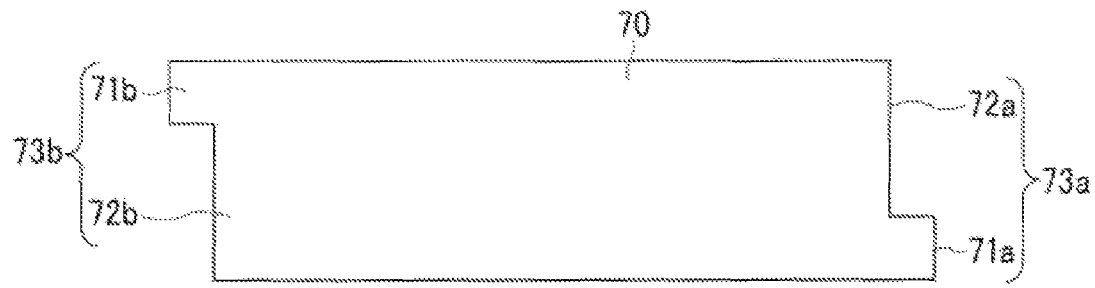
FIG. 12A is a development view of a top foil of a fourth embodiment of the present invention.
Figure 12B:
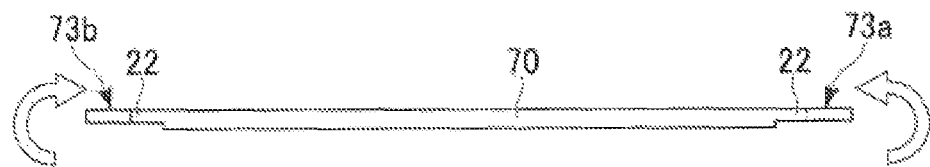
FIG. 12B is a development side view of the top foil.

As shown in FIGS. 12A and 12B, a top foil 70 of the radial foil bearing in this embodiment is formed having the same shape as that of the top foil 31 shown in FIGS. 6C and 6D.

Figure 12C:
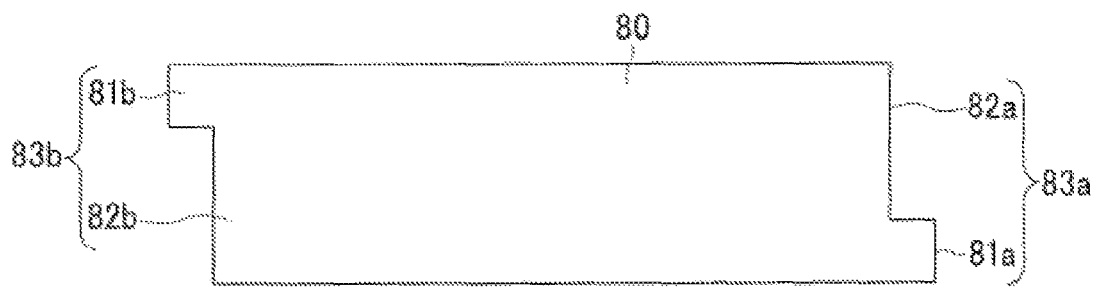
FIG. 12C is a development view of an intermediate foil.
Figure 12D:
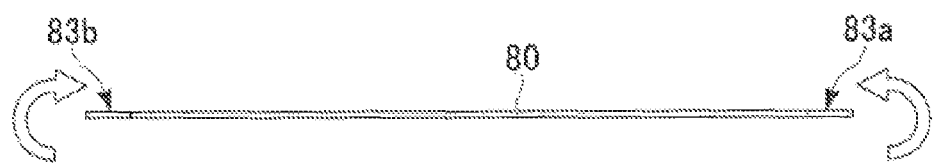
FIG. 12D is a development side view of the intermediate foil.

As shown in FIGS. 12C and 12D, an intermediate foil 80 is formed having the same shape as that of the top foil 70.

As shown in FIGS. 12A and 12B, the top foil 70 is provided with a first uneven portion 73a and a second uneven portion 73b, wherein the first uneven portion 73a includes a projecting portion 71a and a depressed portion 72a which are formed on one edge (short side) of the top foil 70, and the second uneven portion 73b includes a projecting portion 71b and a depressed portion 72b which are formed on another edge (short side) thereof opposite to the one edge (short side). The depressed portion 72b of the second uneven portion 73b is formed corresponding to the projecting portion 71a of the first uneven portion 73a, and the depressed portion 72a of the first uneven portion 73a is formed corresponding, to the projecting portion 71b of the second uneven portion 73b. In addition, as shown in FIG. 12B. the top foil 70 is also provided with thin portions 22 formed on both end portions thereof.

The depressed portion 72b of the second uneven portion 73b is formed so that the projecting portion 71a passes through the depressed portion 72b when the top foil 70 is wound in a cylindrical shape so as to overlap the first uneven portion 73a and the second uneven portion 73b with each other. Similarly, the depressed portion 72a of the first uneven portion 73a is formed so that the projecting portion 71b passes through the depressed portion 72a when the top foil 70 is wound in a cylindrical shape. In this embodiment. the widths (widths in the axial direction) of the depressed portions 72b and 72a are formed sufficiently greater than the widths of the projecting portions 71a and 71b, respectively. In addition, the projecting portions 71a and 71b are formed so that the widths thereof correspond to the lengths of engagement grooves (described below) and the widths are approximately the same as the lengths, similarly to the third embodiment.

As shown in FIGS. 12C and 12D, the intermediate foil 80 is provided with a first uneven portion 83a (uneven portion) and a second uneven portion 83b (uneven portion), wherein the first uneven portion 83a includes a projecting portion 81a and a depressed portion 82a which are formed on one edge (short side) of the intermediate foil 80, and the second uneven portion 83b includes a projecting portion 81b and a depressed portion 82b which are formed on another edge (short side) thereof opposite to the one edge (short side). The depressed portion 82b of the second uneven portion 83b is formed corresponding to the projecting portion 81a of the first uneven portion 83a, and the depressed portion 82a of the first uneven portion 83a is formed corresponding to the projecting portion 81b of the second uneven portion 83b.

The depressed portion 82b of the second uneven portion 83b is formed so that the projecting portion 81a passes through the depressed portion 82b when the intermediate foil 80 is wound in a cylindrical shape so as to overlap the first uneven portion 83a and the second uneven portion 83b with each other. Similarly, the depressed portion 82a of the first uneven portion 83a is formed so that the projecting portion 81b passes through the depressed portion 82a when the intermediate foil 80 is wound in a cylindrical shape. In this embodiment, the widths (widths in the axial direction) of the depressed portions 82b and 82a are formed sufficiently greater than the widths of the projecting portions 81a and 81b, respectively In addition, the projecting portions 81a and 81b are formed so that the widths thereof correspond to the lengths of engagement grooves (described below) and the widths are approximately the same as the lengths, similarly to the third embodiment.

Figure 13A:
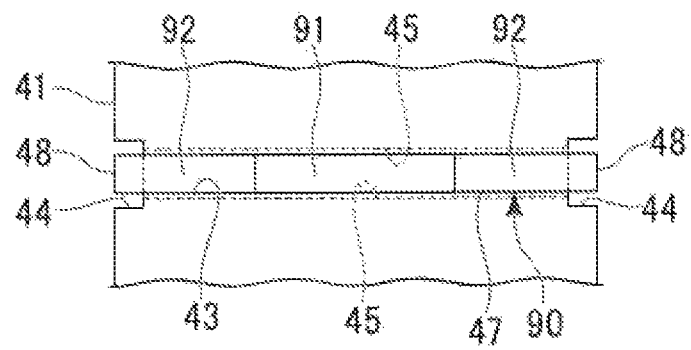
FIG. 13A is a plan view showing a state where a fixing member is fitted into a through groove.
Figure 13B:
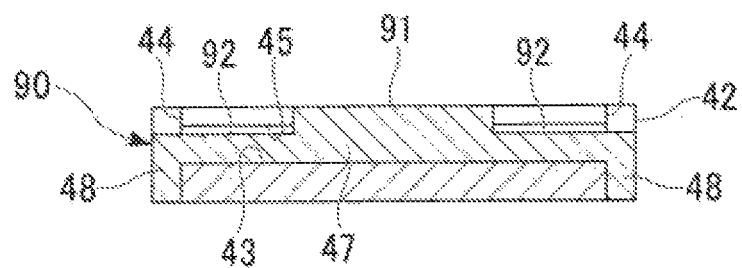
FIG. 13B is a cross-sectional side view showing a state where the fixing member is fitted into the through groove.

As shown in FIGS. 13A and 13B, a fixing member 90 is fitted and locked in a through groove 43 formed on the inner circumferential surface of a bearing housing 41. The fixing member 90 includes a bar-shaped (square pole-shaped) base portion 47 which is fitted and accommodated in the through groove 43, a pair of bent pieces 48 which are formed on both ends of the base portion 47 and which are locked in locking grooves 44, and a partition portion 91 which is formed in an intermediate portion of the base portion 47 and which projects opposite to the bent pieces 48.

The fixing member 90 is different from the fixing member 46 shown in FIGS. 8B and 8C, only in that one partition portion 91 is formed instead of two partition pieces 49. Accordingly, in this embodiment, as shown in FIGS. 13A and 13B, engagement grooves 92 are formed on both sides of the partition portion 91, that is, on two positions in total. In addition, the partition portion 91 is formed sufficiently longer than the partition piece 49, and as shown in FIG. 13B, no engagement groove is formed at the position corresponding to the partition portion 91. That is, in this embodiment, the engagement grooves 92 are not formed on the entire length of the through groove 43. The engagement groove 92 are formed at the positions in which the projecting portions 71a and 71b of the top foil 70 shown in FIG. 12A and the projecting portions 81a and 81b of the intermediate foil 80 shown in FIG. 12C are disposed.

According to the radial foil bearing having the above configuration, it is possible to obtain operation and effect equivalent to that of the radial foil bearing 40 in the third embodiment. That is, the projecting portions 71a and 71b pulled out from the depressed portions 72b and 72a and the projecting portions 81a and 81b pulled out from the depressed portions 82b and 82a are engaged with the engagement grooves 92 which are formed in the through groove 43 on the inner circumferential surface of the bearing housing 41 using the fixing member 90. Therefore, the top foil 70 and the intermediate foil 80 can be accommodated in and fixed to the bearing housing 41 without performing spot welding or bending machining on the top foil 70 or on the intermediate foil 80 and without occurrence of a large reaction force therein from both ends toward the center thereof. Accordingly, direct occurrence of distortion of the top foil 70 can be prevented, and occurrence of distortion of the top foil 70 by reflecting, in the top foil 70, the distortion occurring in the intermediate foil 80 can also be prevented. Thus, since the distortion of the top foil 70 is sufficiently decreased, the designed favorable performance of the bearing can be obtained with respect to the load capability or the dynamic characteristics (the rigidity and the damping performance) thereof.

The intermediate foil 80 is disposed between the top foil 70 and a back foil 42, and thus, if shaft vibration (self-excited vibration) occurs in the rotary shaft 1 during rotation, it is possible to suppress the shaft vibration (self-excited vibration) and to easily settle the shaft vibration, using the above-described damping effect. Furthermore, the intermediate foil 80 can increase the rigidity of the top foil 70. Thus, the dynamic characteristics (the rigidity and the damping performance) of the radial foil bearing can be sufficiently improved.

Since the thin portions 22 are formed on both end portions of the top foil 70, force (local preload) clamping the rotary shaft 1 also does not occur at both end portions of the top foil 70 as described above. Thus, it is possible to prevent the starting torque from increasing due to preload, and to prevent the amount of heat generated during operation from exceeding the set value.

In the above-described fourth embodiment, the development shape of the intermediate foil 80 is formed being the same as the development shape of the top foil 70, and the projecting portions 81a and 81b of the intermediate foil 80 together with the projecting portions 71a and 71b of the top foil 70 are engaged with the engagement grooves 92 corresponding thereto. However, similarly to the case in the third embodiment, the intermediate foil 80 may be provided with only a projecting portion formed on one edge (short side) thereof. Furthermore, the intermediate foil 80 may be formed having a rectangular shape by cutting off both short sides thereof. In this case, the intermediate foil 80 is inserted between the back foil 42 and the top foil 70 and is held therebetween using friction, and thus the intermediate foil 80 is prevented from popping out of the bearing housing 41 even if a positional difference in the axial direction occurs between the intermediate foil 80 and the bearing housing 41.

The present invention is not limited to the above first to fourth embodiments and is limited only by the scopes of the attached claims. The shape, the combination or the like of each component shown in the above-described embodiments is an example, and additions, omissions, replacements, and other modifications of configurations based on design requests or the like can be adopted within the scope of and not departing from the gist of the present invention.

For example, in the above embodiments, an intermediate foil composed of one sheet is used. However, a plurality of intermediate foils may be disposed overlapping with each other, to be multi-layered. In this way, if the multi-layered intermediate foils are disposed between a back foil and a top foil, the damping effect obtained using friction caused by a slide between the intermediate foils is added to the damping effect obtained using friction caused by a slide between the top foil and the intermediate foil or between the intermediate foil and the back foil. Thus, it is possible to further suppress the shaft vibration (self-excited vibration) of a rotary shaft and to further easily settle the shaft vibration.

In order to improve the damping effect of a radial foil bearing, as described above, the adoption of multi-layered intermediate foils is effective. However, in the related art, since an intermediate foil is spot-welded on a bearing housing, it is necessary to control the thickness of the intermediate foil so as to prevent melt of the intermediate foil through the welding, and thus the thickness of the intermediate foil is set to be approximately equivalent to that of a top foil. Therefore, if intermediate foils having such a thickness are disposed overlapping with each other, to be multi-layered, the rigidity of the bearing surface (the rigidity obtained by adding up these of the top foil and of the intermediate foils) becomes very high, and thus the bearing surface may not properly accept film pressure variation of a fluid lubrication film caused by shaft vibration. As a result, the damping effect based on a "slide" between foils may not be easily obtained.

In contrast, in the above embodiments, without welding an intermediate foil on a bearing housing, by engaging a projecting portion thereof with an engagement groove, the intermediate foil is fixed between a back foil and a top foil, and accordingly, the intermediate foil can be formed having a sufficiently less thickness than that of the top foil. Thus, while the rigidity of the bearing surface is suppressed to be an appropriate level (strength), a multi-layered structure of intermediate foils can be adopted.

In the top foil or the intermediate foil, each of the first and second uneven portions is formed including one or two projecting portions and one or two depressed portions.

However, the number of the projecting portions or of the depressed portions may be three or more.

In addition, the thin portion 22 may be formed by, for example, etching both surfaces thereof, to be thinned.

In the first and second embodiments. the back foil 12 composed of one sheet is used and is fixed to the bearing housing through spot welding or the like. However, the back foil 42 composed of three back foil pieces 42a shown in the third and fourth embodiments may be used therein instead of such a back foil 12, and may be fixed to the bearing housing through the locking members 60.

On the other hand, in the third and fourth embodiments, the back foil 12 composed of one sheet shown in the first and second embodiments may be used therein instead of the back foil 42 composed of three back foil pieces 42a, and may be fixed to the bearing housing.

In the third and fourth embodiments, the engagement projection, which is engaged with the engagement notch 42d of the back foil piece 42a, may not be formed using the locking member 60. The engagement projection may be formed directly on the inner circumferential surface of the bearing housing 41.

In addition, in the third and fourth embodiments, as shown in FIGS. 9A and 9B, the engagement notch 42d of the back foil piece 42a is engaged with the engagement projection 63a formed using the locking member 60, and thereby the back foil piece 42a is fixed to the bearing housing 41. However, a back foil of the present invention is not limited to such a structure. For example, each back foil piece 42a may be fixed to the bearing housing 41 using a locking member 51 as shown in FIGS. 14A and 14B.

Figure 14A:
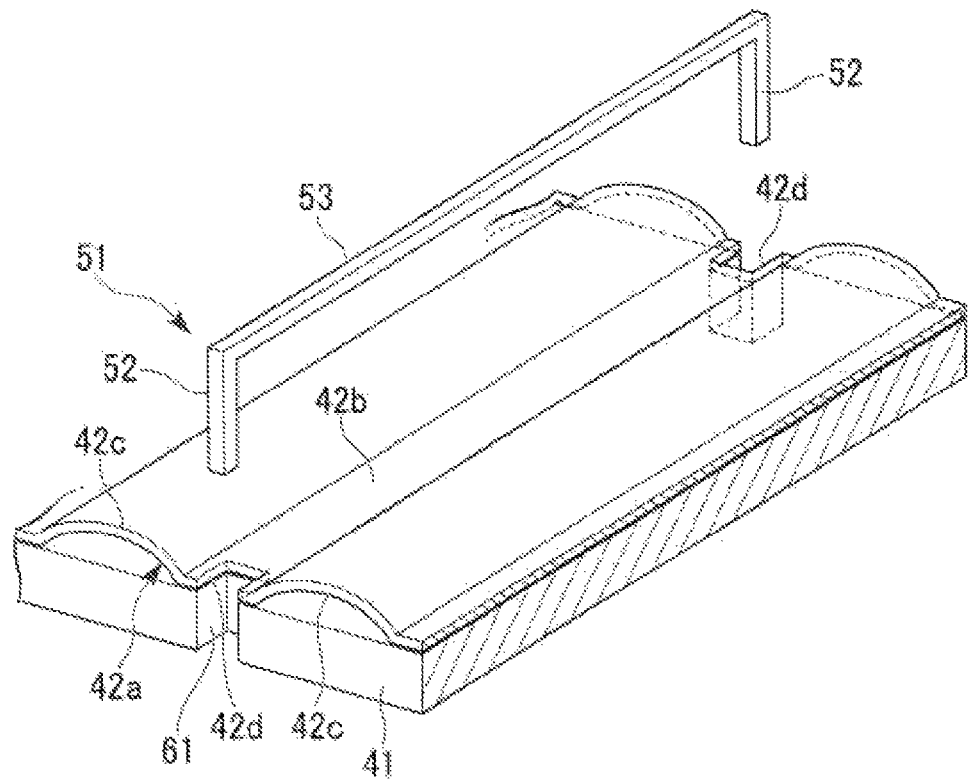
FIG. 14A is an exploded perspective view of a main section of a radial foil bearing of a modification of a back foil structure.
Figure 14B:
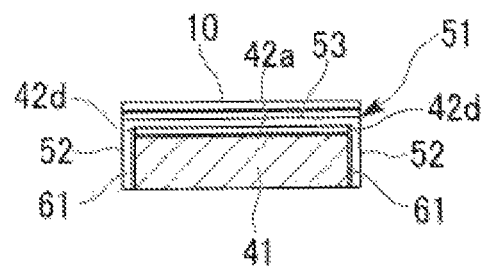
FIG. 14B is a cross-sectional view of a main section of the radial foil bearing.

As shown in FIGS. 14A and 14B, the locking member 51 includes a pair of engagement legs 52 and a connection portion 53 which is disposed at one end of each engagement leg 52 and which connects the engagement legs 52. One engagement leg 52 engages with the engagement recess 61 positioned on one side surface of the bearing housing 41 and with the engagement notch 42d of the back foil piece 42a, and the other engagement leg 52 engages with the engagement recess 61 positioned on the other side surface of the bearing housing 41 and with the engagement notch 42d of the back foil piece 42a. As shown in FIG. 14B, the length of the engagement leg 52 is set to be approximately equivalent to the length obtained by adding up the thickness of the bearing housing 41 and the thickness of the back foil piece 42a. In addition, as shown in FIGS. 14A and 14B, the connection portion 53 is disposed between the valley portion 42b of the back foil piece 42a and the top foil 10.

According to the above configuration, the locking member 51 functions as a fixing member which fixes the back foil piece 42a to the bearing housing 41 because the engagement legs 52 engage with the engagement recesses 61 of the bearing housing 41 and with the engagement notches 42d of the back foil piece 42a. In addition, since the connection portion 53 is covered with the top foil 10, the locking member 51 is prevented from being detached from the back foil piece 42a. Therefore, it is possible to reliably fix the back foil piece 42a to the bearing housing 41.

In the third and fourth embodiments, the back foil 42 is composed of three back foil pieces 42a. However, the back foil 42 may be a single member in which one metal foil is formed in a substantially cylindrical shape. Furthermore, in a case where a plurality of back foil pieces 42a are used. the back foil 42 may be composed of two, four or more back foil pieces 42a.

In addition, in the above embodiments, the bearing housing is formed in a cylindrical shape. However, an annular flange may be integrally formed on one side surface or on each of both side surfaces of a bearing housing, and the whole shape of the bearing housing may be formed in an approximately cylindrical shape. The bearing housing can be easily attached to the housing or the like of a turbo machine, by forming the flange.

INDUSTRIAL APPLICABILITY

The present invention can be applied to a radial foil bearing which supports a rotary shaft so as to encircle the rotary shaft.

DESCRIPTION OF REFERENCE SIGNS 1 rotary shaft
3, 30, 40 radial foil bearing
10, 31, 70 top foil
11, 35, 80 intermediate foil
12, 42 back foil (bump foil)
13, 36, 41 bearing housing
14, 37, 50, 92 engagement groove
16a, 16b, 32a, 32b, 71a, 71b projecting portion
17a, 17b, 33a, 33b, 72a, 72b depressed portion
18a, 34a, 73a first uneven portion
18b, 34b 73b second uneven portion
19a, 19b, 81a, 81b projecting portion
20a, 20b, 82a, 82b depressed portion
21a, 83a first uneven portion (uneven portion)
21b, 83b second uneven portion (uneven portion)
42a back foil piece
43 through groove
44 locking groove
45 locking recess
46, 90 fixing member
47 base portion
48 bent piece
49 partition piece
91 partition portion

The invention claimed is:

1. A radial foil bearing used for supporting a rotary shaft so as to encircle the rotary shaft, the radial foil bearing comprising:
   a cylindrical top foil disposed so as to face the rotary shaft;
   an intermediate foil disposed outside of the top foil in a radial direction thereof;
   a back foil disposed outside of the intermediate foil in the radial direction; and
   a cylindrical bearing housing accommodating the top foil, the intermediate foil and the back foil,
   wherein engagement grooves are formed on an inner circumferential surface of the bearing housing in an axial direction thereof,
   the top foil is formed by winding a rectangular metal foil which includes a first uneven portion and a second uneven portion, into a cylindrical shape so as to overlap the first and second uneven portions with each other, the first uneven portion being composed of a projecting portion and a depressed portion formed on one edge of the metal foil, the second uneven portion being composed of a depressed portion and a projecting portion formed on another edge of the metal foil opposite to the one edge, the projecting portion of the first uneven portion is disposed so as to be pulled out near the bearing housing through the depressed portion of the second uneven portion, the projecting portion of the second uneven portion is disposed so as to be pulled out near the bearing housing through the depressed portion of the first uneven portion, and the projecting portions of the first and second uneven portions pulled out near the bearing housing engage with the engagement grooves.

2. The radial foil bearing according to claim 1, wherein the intermediate foil has a multi-layered structure including foils overlapping with each other.

3. The radial foil bearing according to claim 1, wherein the intermediate foil is formed of a rectangular metal foil including an uneven portion which is composed of a projecting portion and a depressed portion formed on at least one edge of the metal foil, and the projecting portion of the uneven portion engages with one of the engagement grooves.

4. The radial foil bearing according to claim 1, wherein a through groove is formed on the inner circumferential surface of the bearing housing, the through groove being continuous from one end to another end in the axial direction of the bearing housing, a fixing member is fitted into the through groove, the fixing member dividing the through groove in a length direction thereof, thereby forming the engagement grooves, and a restriction portion is provided in the through groove and the fixing member, the restriction portion restricting movement of the fixing member in the length direction of the through groove.

5. The radial foil bearing according to claim 4, wherein a locking recess is formed on an inner side surface of the through groove in the length direction of the through groove, the locking recess allowing a tip portion of the projecting portion of the top foil to be locked therein.

6. The radial foil bearing according to claim 4, wherein the restriction portion includes locking grooves and bent pieces, the locking grooves being formed on both side surfaces of the bearing housing in a thickness direction of the bearing housing so as to communicate with both end portions of the through groove, the bent pieces being formed at both end portions of the fixing member so as to be locked into the locking grooves.

7. The radial foil bearing according to claim 4, wherein thin portions are formed on the one edge and on the other edge of the top foil, the thin portions being thinner than an intermediate portion therebetween.

8. The radial foil bearing according to claim 7, wherein surfaces of the thin portions, which are opposite to surfaces thereof facing the rotary shaft, are formed so as to be depressed from a surface of the intermediate portion, which is opposite to a surface thereof facing the rotary shaft.

9. The radial foil bearing according to claim 1, wherein thin portions are formed on the one edge and on the other edge of the top foil, the thin portions being thinner than an intermediate portion therebetween.

10. The radial foil bearing according to claim 9, wherein surfaces of the thin portions, which are opposite to surfaces thereof facing the rotary shaft, are formed so as to be depressed from a surface of the intermediate portion, which is opposite to a surface thereof facing the rotary shaft.

* * * * *